United States Patent
Ma et al.

(10) Patent No.: US 11,700,080 B2
(45) Date of Patent: Jul. 11, 2023

(54) MAXIMUM TRANSPORT BLOCK SIZES AND SPAN FOR A TRANSPORT BLOCK IN A NON-TERRESTRIAL NETWORK

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Ayan Sengupta, San Diego, CA (US); Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 17/101,866

(22) Filed: Nov. 23, 2020

(65) Prior Publication Data
US 2022/0166536 A1 May 26, 2022

(51) Int. Cl.
*H04L 1/00* (2006.01)
*H04L 1/18* (2023.01)
(Continued)

(52) U.S. Cl.
CPC .......... *H04L 1/0007* (2013.01); *H04L 1/0061* (2013.01); *H04L 1/1819* (2013.01);
(Continued)

(58) Field of Classification Search
CPC ..... H04W 52/36; H04W 52/34; H04W 52/30; H04W 52/242; H04W 52/265;
(Continued)

(56) References Cited

U.S. PATENT DOCUMENTS

2018/0278374 A1* 9/2018 Zeng ................... H04L 1/1812
2019/0363832 A1* 11/2019 Yang .................... H04L 1/1854
(Continued)

FOREIGN PATENT DOCUMENTS

| CN | 104901900 B | 8/2018 |
|---|---|---|
| WO | 2018143785 A1 | 8/2018 |
| WO | 2019160737 A1 | 8/2019 |

OTHER PUBLICATIONS

Partial International Search Report—PCT/US2021/071667—ISA/EPO—dated Jan. 31, 2022.
(Continued)

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment (UE) may transmit a report of a maximum transport block size supported by the UE for if hybrid automatic repeat request (HARQ) feedback is enabled and a maximum transport block size for is HARQ is disabled. The UE may receive, based at least in part on transmitting the report, one or more transport blocks that have a transport block size that does not exceed the maximum transport block sizes supported by the UE. In some aspects, the UE may receive an indication of a length of a span for receiving a set of bits from channel encoder output for a transport block or a redundancy version of a transport block. Numerous other aspects are provided.

30 Claims, 14 Drawing Sheets

(51) Int. Cl.
  *H04W 72/04* (2023.01)
  *H04W 76/11* (2018.01)
  *H04W 76/27* (2018.01)
  *H04L 1/1812* (2023.01)
  *H04W 52/24* (2009.01)
  *H04W 52/26* (2009.01)
  *H04W 52/36* (2009.01)
  *H04W 72/0446* (2023.01)
  *H04W 80/02* (2009.01)
  *H04W 72/23* (2023.01)

(52) U.S. Cl.
  CPC ....... *H04W 52/242* (2013.01); *H04W 52/265* (2013.01); *H04W 52/367* (2013.01); *H04W 72/0446* (2013.01); *H04W 72/23* (2023.01); *H04W 76/11* (2018.02); *H04W 76/27* (2018.02); *H04W 80/02* (2013.01)

(58) Field of Classification Search
  CPC ... H04W 52/365; H04W 76/10; H04W 76/27; H04W 72/042; H04W 72/0446; H04L 1/18; H04L 1/0007; H04L 1/0061; H04L 1/1819
  See application file for complete search history.

(56) References Cited

U.S. PATENT DOCUMENTS

2021/0219329 A1\* 7/2021 Zhou ................. H04W 72/1257
2022/0116171 A1\* 4/2022 Zhang ................. H04W 72/042

OTHER PUBLICATIONS

Samsung: "Enhancements on HARQ for NTN", 3GPP Draft R1-2008166, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 23, 2020 (Oct. 23, 2020), XP051945343, Retrieved from the Internet: URL: https://www.3gpp.org/ftp/tsg_ran/WG1_RL1/TSGR1_103-e/Docs/R1-2008166.zip, R1-2008166 Enhancements on HARQ for NTN Samsung.DOCX [retrieved on Oct. 23, 2020], Sections 3-5.
International Search Report and Written Opinion—PCT/US2021/071667—ISA/EPO—dated Mar. 21, 2022.

\* cited by examiner

MAXIMUM TRANSPORT BLOCK SIZES AND SPAN FOR A TRANSPORT BLOCK IN A NON-TERRESTRIAL NETWORK

FIELD OF THE DISCLOSURE

Aspects of the present disclosure generally relate to wireless communication and to techniques and apparatuses for indicating maximum transport block sizes or a span for a transport block in a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting a report of one or more maximum transport block sizes supported by the UE, and receiving, based at least in part on transmitting the report, one or more transport blocks that have a transport block size that does not exceed the maximum transport block sizes supported by the UE.

In some aspects, a method of wireless communication performed by a non-terrestrial network (NTN) entity includes receiving a report of one or more maximum transport block sizes supported by a UE, and transmitting, to the UE, one or more transport blocks that have a transport block size that does not exceed the maximum transport block sizes based at least in part on receiving the report.

In some aspects, a method of wireless communication performed by a UE includes receiving, from an NTN entity, an indication of a length of a span for receiving a set of bits from channel encoder output for a transport block or a redundancy version of a transport block, and receiving, within a span having the indicated length, a set of bits from channel encoder output for a transport block or a redundancy version of a transport block.

In some aspects, a method of wireless communication performed by an NTN entity includes transmitting, to a UE, an indication of a length of a span for receiving a set of bits from channel encoder output for a transport block or a redundancy version of a transport block, and transmitting, within a span having the indicated length, a set of bits from channel encoder output for a transport block or a redundancy version of a transport block.

In some aspects, a UE for wireless communication includes a memory and one or more processors operatively coupled to the memory, the memory and the one or more processors configured to transmit a report of one or more maximum transport block sizes supported by the UE, and receive, based at least in part on transmitting the report, one or more transport blocks that have a transport block size that does not exceed the maximum transport block sizes supported by the UE.

In some aspects, an NTN entity for wireless communication includes a memory and one or more processors operatively coupled to the memory, the memory and the one or more processors configured to receive a report of one or more maximum transport block sizes supported by a UE, and transmit, to the UE, one or more transport blocks that have a transport block size that does not exceed the maximum transport block sizes based at least in part on receiving the report.

In some aspects, a UE for wireless communication includes a memory and one or more processors operatively coupled to the memory, the memory and the one or more processors configured to receive, from an NTN entity, an indication of a length of a set of bits from channel encoder output for a span for receiving a transport block or a redundancy version of a transport block, and receive, within a span having the indicated length, a set of bits from channel encoder output for a transport block or a redundancy version of a transport block.

In some aspects, an NTN entity for wireless communication includes a memory and one or more processors operatively coupled to the memory, the memory and the one or more processors configured to transmit, to a UE, an indication of a length of a span for receiving a set of bits from channel encoder output for a transport block or a redundancy version of a transport block, and transmit, within a span having the indicated length, a set of bits from channel encoder output for a transport block or a redundancy version of a transport block.

In some aspects, a non-transitory computer-readable medium storing a set of instructions for wireless communication includes one or more instructions that, when executed by one or more processors of a UE, cause the UE to transmit a report of one or more maximum transport block sizes supported by the UE, and receive, based at least in part on transmitting the report, one or more transport blocks that have a transport block size that does not exceed the maximum transport block sizes supported by the UE.

In some aspects, a non-transitory computer-readable medium storing a set of instructions for wireless communication includes one or more instructions that, when executed by one or more processors of an NTN entity, cause the NTN entity to receive a report of one or more maximum transport block sizes supported by a UE and transmit, to the UE, one or more transport blocks that have a transport block size that does not exceed the maximum transport block sizes based at least in part on receiving the report.

In some aspects, a non-transitory computer-readable medium storing a set of instructions for wireless communication includes one or more instructions that, when executed by one or more processors of a UE, cause the UE to receive, from an NTN entity, an indication of a length of a span for receiving a set of bits from channel encoder output for a transport block or a redundancy version of a transport block, and receive, within a span having the indicated length, a set of bits from channel encoder output for a transport block or a redundancy version of a transport block.

In some aspects, a non-transitory computer-readable medium storing a set of instructions for wireless communication includes one or more instructions that, when executed by one or more processors of an NTN entity, cause the NTN entity to transmit, to a UE, an indication of a length of a span for receiving a set of bits from channel encoder output for a transport block or a redundancy version of a transport block, and transmit, within a span having the indicated length, a set of bits from channel encoder output for a transport block or a redundancy version of a transport block.

In some aspects, an apparatus for wireless communication includes means for transmitting a report of one or more maximum transport block sizes supported by the apparatus, and means for receiving, based at least in part on transmitting the report, one or more transport blocks that have a transport block size that does not exceed the maximum transport block sizes supported by the apparatus.

In some aspects, an apparatus for wireless communication includes means for receiving a report of one or more maximum transport block sizes supported by a UE, and means for transmitting, to the UE, one or more transport blocks that have a transport block size that does not exceed the maximum transport block sizes based at least in part on receiving the report.

In some aspects, an apparatus for wireless communication includes means for receiving, from an NTN entity, an indication of a length of a span for receiving a set of bits from channel encoder output for a transport block or a redundancy version of a transport block, and means for receiving, within a span having the indicated length, a set of bits from channel encoder output for a transport block or a redundancy version of a transport block.

In some aspects, an apparatus for wireless communication includes means for transmitting, to a UE, an indication of a length of a span for receiving a set of bits from channel encoder output for a transport block or a redundancy version of a transport block, and means for transmitting, within a span having the indicated length, a set of bits from channel encoder output for a transport block or a redundancy version of a transport block.

Aspects generally include a method, apparatus, system, computer program product, non-transitory computer-readable medium, user equipment, base station, NTN entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
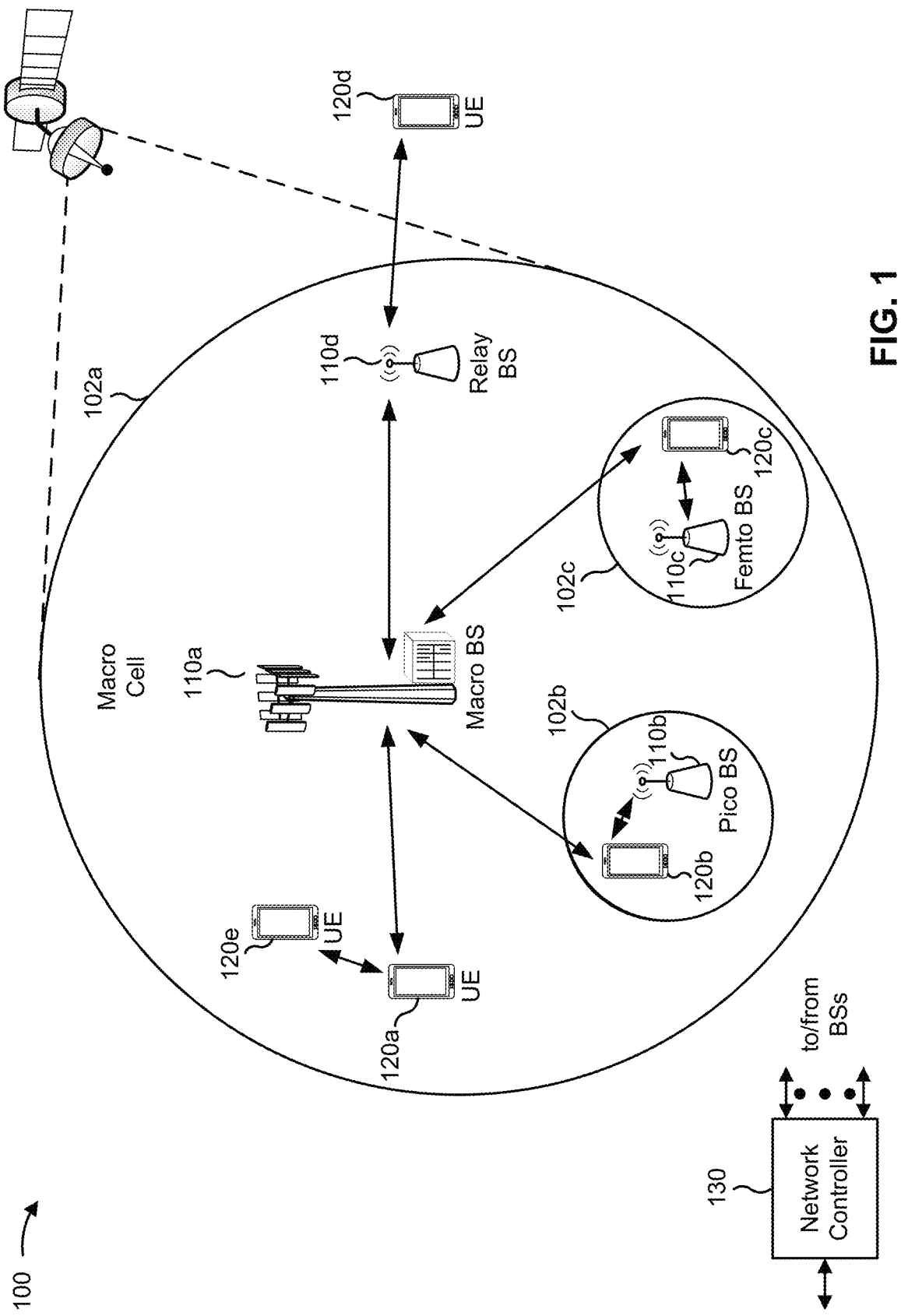
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

In some aspects, as shown, a cell may be provided by a base station 110 of a non-terrestrial network. As used herein, "non-terrestrial network" may refer to a network for which access is provided by a non-terrestrial base station, such as a base station carried by a satellite, a balloon, a dirigible, an airplane, an unmanned aerial vehicle, a high altitude platform station, and/or the like.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like. In some aspects, a relay station may be implemented using a non-terrestrial platform, similarly to the base station described above.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
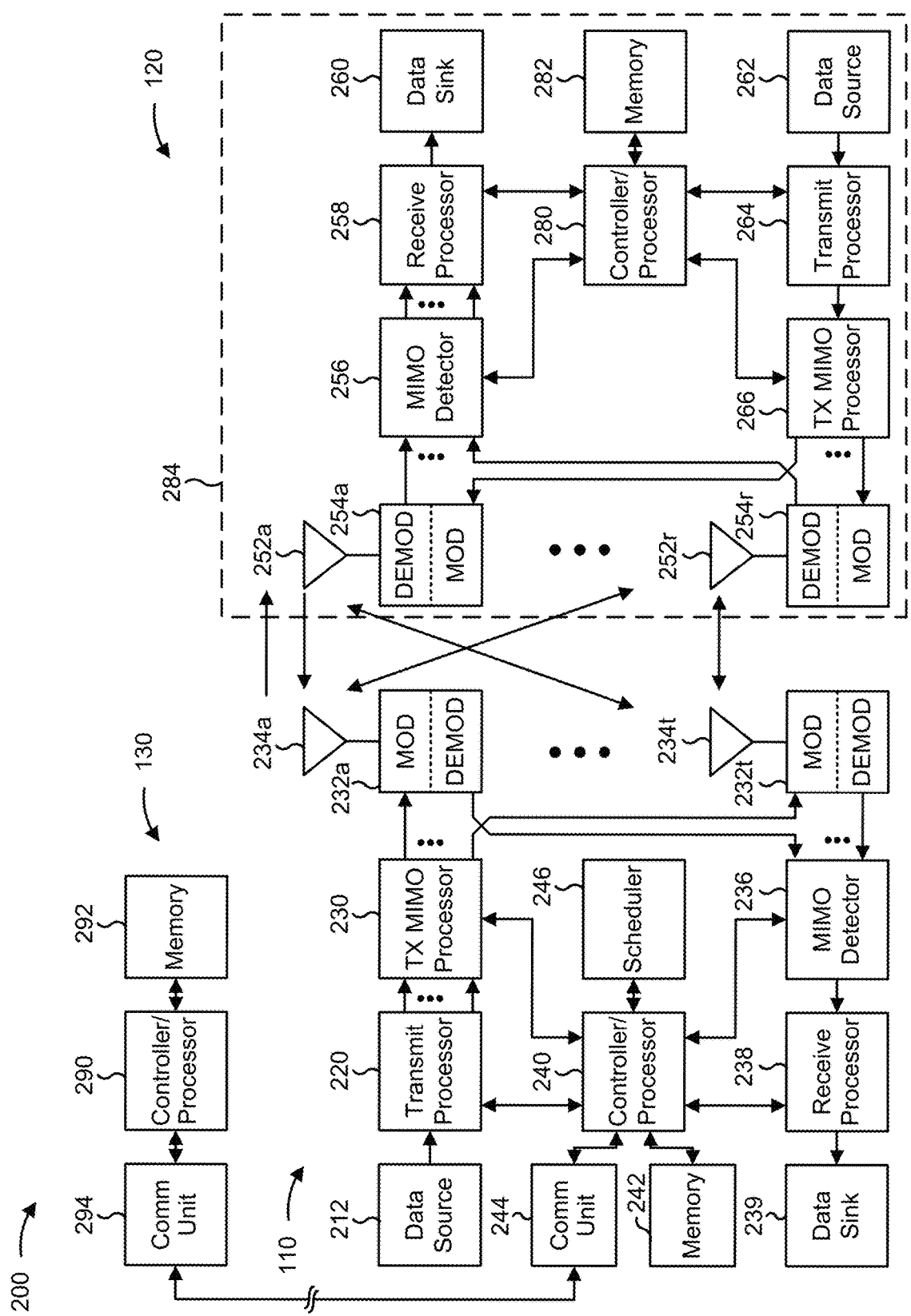
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols.

A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-14.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-14.

Controller/processor 240 of base station 110, controller/processor 280 of UE 120, and/or any other component(s) of FIG. 2 may perform one or more techniques associated with indicating maximum transport block sizes or a span for a transport block in a non-terrestrial network (NTN), as described in more detail elsewhere herein. For example, a controller/processor of an NTN entity (e.g., controller/processor 240 of base station 110), controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. A memory may store data and program codes for the NTN entity, and memories 242 and 282 may store data and program codes for base station 110 and UE 120, respectively. In some aspects, the memory for the NTN entity, memory 242, and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the NTN entity, the base station 110, and/or the UE 120, may cause the one or more processors, the NTN entity, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some aspects, executing instructions may include running the instructions, converting the instructions, compiling the instructions, interpreting the instructions, and/or the like.

In some aspects, the UE 120 includes means for transmitting a report of one or more maximum transport block sizes supported by the UE, and/or means for receiving, based at least in part on transmitting the report, one or more transport blocks that have a transport block size that does not exceed the maximum transport block sizes supported by the UE. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for determining the one or more maximum transport block sizes based at least in part on a soft buffer size of the UE.

In some aspects, the UE 120 includes means for determining the one or more maximum transport block sizes based at least in part on a speed at which the UE processes received communications.

In some aspects, the UE 120 includes means for determining the one or more maximum transport block sizes based at least in part on a throughput requirement.

In some aspects, the NTN entity includes means for receiving a report of one or more maximum transport block sizes supported by a UE, and/or means for transmitting, to the UE and based at least in part on receiving the report, one or more transport blocks that have a transport block size that does not exceed the maximum transport block sizes. The means for the NTN entity to perform operations described herein may include, for example, components such as transmit processor 220, TX MIMO processor 230, modulator 232, antenna 234, demodulator 232, MIMO detector 236, receive processor 238, controller/processor 240, memory 242, and/or scheduler 246.

In some aspects, the UE 120 includes means for receiving, from an NTN entity, an indication of a length of a span for receiving a set of bits from channel encoder output for a transport block or a redundancy version of a transport block, and/or means for receiving, within a span having the indicated length, a set of bits from channel encoder output for a transport block or a redundancy version of a transport block. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the NTN entity includes means for transmitting, to a UE, an indication of a length of a span for receiving a set of bits from channel encoder output for a transport block or a redundancy version of a transport block; and/or means for transmitting, within a span having the indicated length, a set of bits from channel encoder output for a transport block or a redundancy version of a transport block. The means for the NTN entity to perform operations described herein may include, for example, components such as transmit processor 220, TX MIMO processor 230, modulator 232, antenna 234, demodulator 232, MIMO detector 236, receive processor 238, controller/processor 240, memory 242, and/or scheduler 246.

In some aspects, the NTN entity includes means for determining the length of the span based at least in part on a soft buffer size of the UE.

In some aspects, the NTN entity includes means for determining the length of the span based at least in part on a speed at which the UE processes received communications.

In some aspects, the NTN entity includes means for determining the length of the span based at least in part on a throughput requirement for the UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
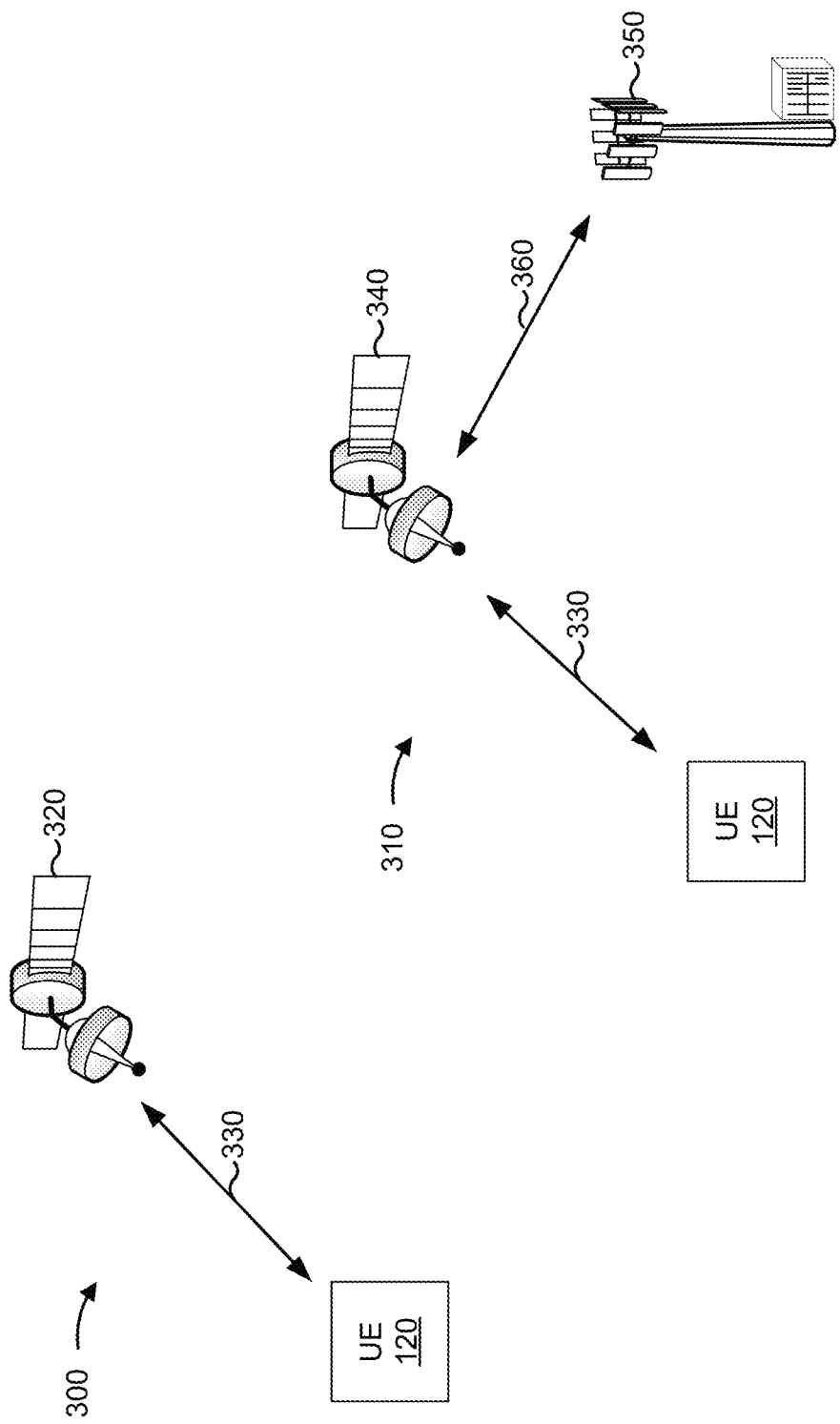
FIG. 3 is a diagram illustrating an example of a regenerative satellite deployment and an example of a transparent satellite deployment in a non-terrestrial network (NTN).

FIG. 3 is a diagram illustrating an example 300 of a regenerative satellite deployment and an example 310 of a transparent satellite deployment in an NTN.

Example 300 shows a regenerative satellite deployment. In example 300, a UE 120 is served by a satellite 320 via a service link 330. For example, the satellite 320 may include a BS 110 (e.g., BS 110a), a gNB, and/or the like. In some aspects, the satellite 320 may be referred to as a non-terrestrial base station, a regenerative repeater, an on-board processing repeater, an NTN entity, and/or the like. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. Satellite 340 may also be considered to be an NTN entity. The satellite 340 may be a transparent satellite. The satellite 340 may relay a signal received from gateway 350 via a feeder link 360. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, a Global Positioning System (GPS) capability, and/or the like, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Due to a distance between a UE and an NTN entity (e.g., satellite), there may be a long propagation delay for transport blocks. The UE may also use a limited quantity of hybrid automatic repeat request (HARQ) processes for transport blocks from the NTN entity. The HARQ processes may be used for HARQ feedback, including acknowledgements (ACKs) or negative acknowledgements (NACKs). To better utilize the satellite link, the size of a transport block may be increased up to a maximum transport block size.

To increase throughput with a large propagation delay, HARQ feedback for some HARQ processes may be disabled, resulting in a mix of HARQ process types. Some HARQ processes may be disabled, and some HARQ processes may be enabled. The quantity of transmissions a UE may receive during a period of time may be greater if HARQ feedback disabled rather than enabled. In the case of HARQ feedback being disabled, a UE may need to buffer the received signal if the transmission is one-shot. The UE may also need to buffer previous transmissions of a transport block if blind retransmissions are used. If the same maximum transport block sizes are used when HARQ feedback is disabled, the UE may not be able to keep up with the downlink processing, causing the UE to waste power, processing resources, and signaling resources.

According to various aspects described herein, a network may use two different maximum transport block sizes, one for if HARQ feedback is enabled and one for if HARQ feedback is disabled. The maximum transport block size for a HARQ process may also be based at least in part on factors such as throughput requirements. UEs may have different downlink processing capabilities and throughput requirements, and thus a UE may report the maximum transport block sizes for the UE to the network. For example, a UE may report one or more maximum transport block sizes that are supported by the UE, and an NTN entity may transmit, to the UE, transport blocks up to the maximum transport block sizes supported by the UE. The UE may report a maximum transport block size for if HARQ feedback is enabled, and a maximum transport block size for if HARQ feedback is disabled. The UE may also report a maximum quantity of HARQ processes the UE can support. As a result, transport blocks may be extended in size to better fill a pipe between the UE and the NTN entity, but not larger than what a buffer of the UE can handle, whether HARQ feedback is enabled and disabled. The UE conserves power, processing resources, and signaling resources that would otherwise be wasted by transport block size and UE buffer mismatches.

Figure 4:
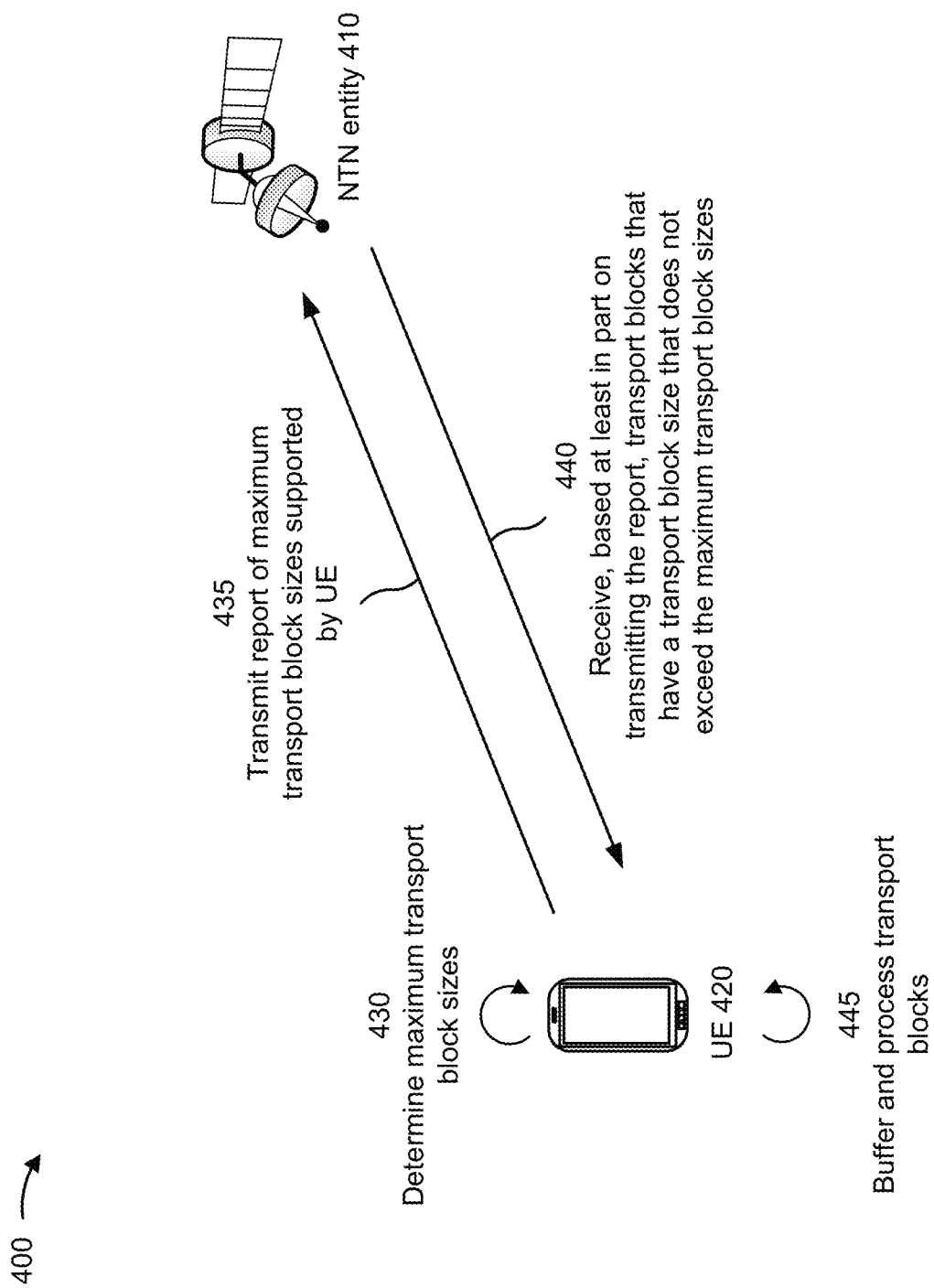
FIG. 4 is a diagram illustrating an example of indicating maximum transport block sizes in an NTN, in accordance with various aspects of the present disclosure.

FIG. 4 is a diagram illustrating an example 400 of indicating maximum transport block sizes in an NTN, in accordance with various aspects of the present disclosure. As shown, FIG. 4 includes an NTN entity 410 (e.g., base station, relay station) and a UE 420 that may communicate with each other over a satellite link. In some aspects, UE 420 may include a ground station.

As shown by reference number 430, UE 420 may determine maximum transport block sizes for UE 420. There may be a maximum transport block size for if HARQ feedback is enabled, and a maximum transport block size for if HARQ feedback is disabled. The quantity of communications UE 420 can receive in a unit of time when HARQ feedback disabled may be much larger than when HARQ feedback enabled, because the network does not need to wait for the HARQ feedback before sending the next communication.

UE 420 may ensure that a soft buffer size of UE 420 is sufficient for various downlink configurations, including for certain combinations of an MCS and a number of layers (e.g., rank). A larger soft buffer size may also mean increased hardware complexity. UE 420 may determine a preferred maximum transport block sizes based at least in part on the soft buffer size and/or a throughput requirement. UE 420 may also determine a preferred maximum transport block size based at least in part on a speed at which the UE processes received communications. For example, if the UE is processing communications rather quickly, the UE may be able to handle larger block sizes. On the other hand, if the UE is having difficulty processing all the received communications, the UE may prefer a smaller transport block size. The speed may be measured as a quantity of processed communications per unit of time. UE 420 may prepare a report that indicates the preferred maximum transport block sizes. As shown by reference number 435, UE 420 may transmit the report to NTN entity 410.

In some aspects, UE 420 may indicate, in the report, a maximum quantity of HARQ processes that the UE 420 may use for HARQ feedback. UE 420 may determine the maximum quantity of HARQ processes based at least in part on a speed at which HARQ feedback is determined and transmitted.

NTN entity 410 may determine a size for one or more transport blocks that are to be transmitted to UE 420 based at least in part on the maximum transport block sizes reported by UE 420. The size for the transport blocks may be based at least in part on if HARQ feedback is enabled or disabled, and the size may be not exceed the reported maximum transport block size that corresponds to the HARQ feedback status. In some aspects, the size for the transport blocks may be right up to the reported maximum transport block size. The size of the transport blocks may also be equal to the reported maximum transport block size.

In example 400, the size of the transport blocks does not exceed the reported maximum transport block sizes. For example, the relevant reported maximum transport block size may be the maximum transport block size for if HARQ feedback is enabled. As shown by reference number 440, NTN entity 410 may transmit the transport blocks. As shown by reference number 445, UE 420 may buffer transport blocks and process transport blocks from the buffer. As a result of the reported maximum transport block sizes, the satellite link is better utilized without compromising the buffer of UE 420.

As indicated above, FIG. 4 is provided as an example. Other examples may differ from what is described with regard to FIG. 4.

In some aspects, a UE may receive a transmission of a transport block. The transmission may include a set of bits from channel encoder output for the transport block or a redundancy version of the transport block. The UE may receive the transmission of the transport block within a span, which is a unit that is comparable to a transmission time interval in LTE. The span may be a time duration, or the span may be a quantity of slots. If there is a power limitation for a UE, an NTN entity may use a narrow bandwidth, which may require multiple slots for reception. However, if the span is too long, signaling resources may be wasted. If the span is too short, the UE may waste power, processing resources, and signaling resources when the UE fails to receive a transport block.

According to various aspects described herein, an NTN entity may indicate, in downlink control information (DCI), a span for a transmission of a transport block, where the transmission is a set of bits from channel encoder output for the transport block (e.g., transport block without repetition) or a redundancy version of the transport block. The span may be a time duration and/or a quantity of slots that is based at least in part on a UE capability of the UE. As a result, the UE does not waste power, processing resources, and/or signaling resources with a mismatched span for a transport block.

Figure 5:
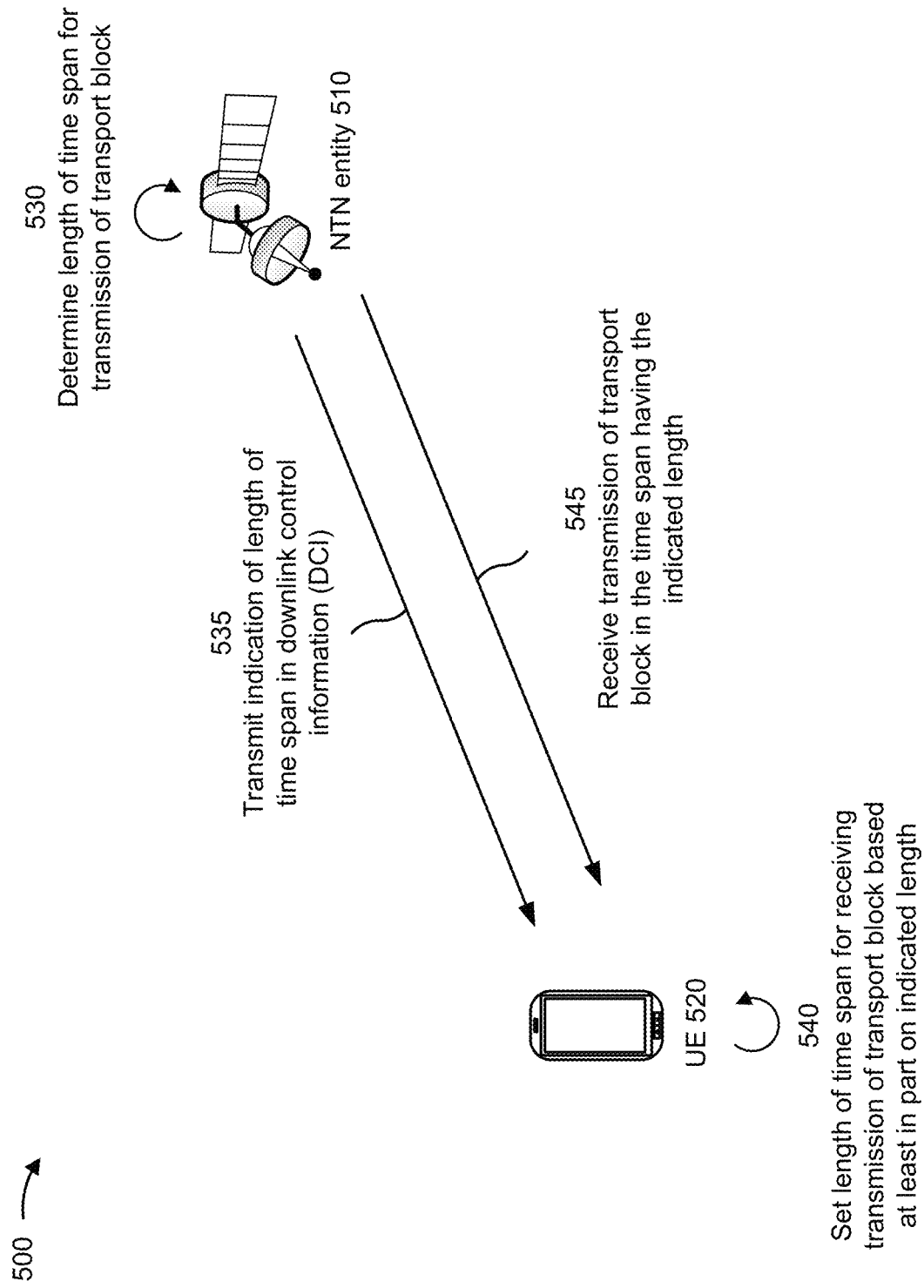
FIG. 5 is a diagram illustrating an example of indicating a span in an NTN, in accordance with various aspects of the present disclosure.

FIG. 5 is a diagram illustrating an example 500 of indicating a span in an NTN, in accordance with various aspects of the present disclosure. As shown, FIG. 5 includes an NTN entity 510 (e.g., base station, relay station) and a UE 520 that may communicate with each other on a satellite link. In some aspects, UE 520 may include a ground station.

As shown by reference number 530, NTN entity 510 may determine a length of a span for a set of bits from channel encoder output for a transport block or a redundancy version of a transport block. The set of bits may be stored in a circular buffer. NTN entity 510 may determine the length of the span based at least in part on a capability of UE 520, link conditions, a location of UE 520, traffic conditions, a speed at which UE 520 processes communications, and/or other factors. As shown by reference number 535, NTN entity 510 may transmit the length in DCI.

As shown by reference number 540, UE 520 may set a length of a "time span" for receiving a set of bits from channel encoder output for a transport block or a redundancy version of the transport block scheduled by the DCI. In example 500, the "time span" may be refer to time or to one or more slots. The length of the time span may be a time duration or a quantity of slots. As shown by reference number 545, UE 520 may receive the set of bits from channel encoder output for the transport block, or the redundancy version of the transport block, within the time span. As a result, UE 520 may be enabled to receive a transmission of a larger transport block that UE 520 can support.

Alternatively, NTN entity 510 may transmit an indication of a length of a time span for transport blocks in a medium access control control element (MAC CE) or a radio resource control (RRC) message. In some aspects, NTN entity 510 may transmit an indication of a starting time for the time span. The indication of the starting time may be in the MAC CE or the RCC message. UE 520 may receive the bits for the transport block or the redundancy version within the time span, which starts at the indicated starting time. The starting time may be a starting symbol.

In some aspects, NTN entity 510 may transmit (e.g., in DCI) an indication that may be used with other fields to determine a length of a time span. For example, NTN entity 510 may transmit an indication of whether the time span is less than a slot, equal to a slot, or more than one slot. This indication may be represented by a radio network temporary identifier (RNTI) that can be used to scramble a cyclic redundancy check (CRC) of DCI, a demodulation reference signal (DMRS) sequences, and/or scrambling sequences applied to rate-matched bits to be modulated. If the indication is for more than one slot, UE 520 may reinterpret a redundancy version field in the DCI such that the redundancy version field and a time domain resource assignment (TDRA) field combine to indicate the length of the time span. A redundancy version field may indicate a quantity of repetitions and/or part of the length of the time span (e.g., quantity of slots). NTN entity 510 may also transmit a zeroth redundancy version of a transport block in a MAC CE or an RRC message without using the redundancy version field in DCI.

In some aspects, a frequency domain resource allocation (FDRA) for a transport block may be less than one RB, and may include a quantity of any subset of subcarriers. The length of the time span may impact various timing relationships, such as a timing for a first slot of a physical downlink shared channel (PDSCH) communication (e.g., K0), a timing from the PDSCH communication to HARQ ACK timing (e.g., K1), a timing from the PDSCH communication or DCI to a first slot of a physical uplink shared channel (PUSCH) (e.g., K2), and/or a K offset (a delay parameter applied in addition to K1 and K2 to account for the large propagation delay). The configuration of a time span and/or timing relationship may be different for uplink than for downlink. For example, a time span may be one slot for downlink and multiple slots for uplink. UE 520 may report a preferred time span of a redundancy version based at least in part on a maximum transmit power, a path loss, and/or quality of service requirements. The preferred time span may be indicated as slots and/or symbols. In some aspects, NTN entity 510 may indicate a granularity of the FDRA, such as whether the FDRA is an RB or a sub-RB using different RNTIs that can be used to scramble a CRC of DCI, different DMRS sequences, and/or different scrambling sequences applied to rate-matched bits to be modulated As indicated above, FIG. 5 is provided as an example. Other examples may differ from what is described with regard to FIG. 5.

Figure 6:
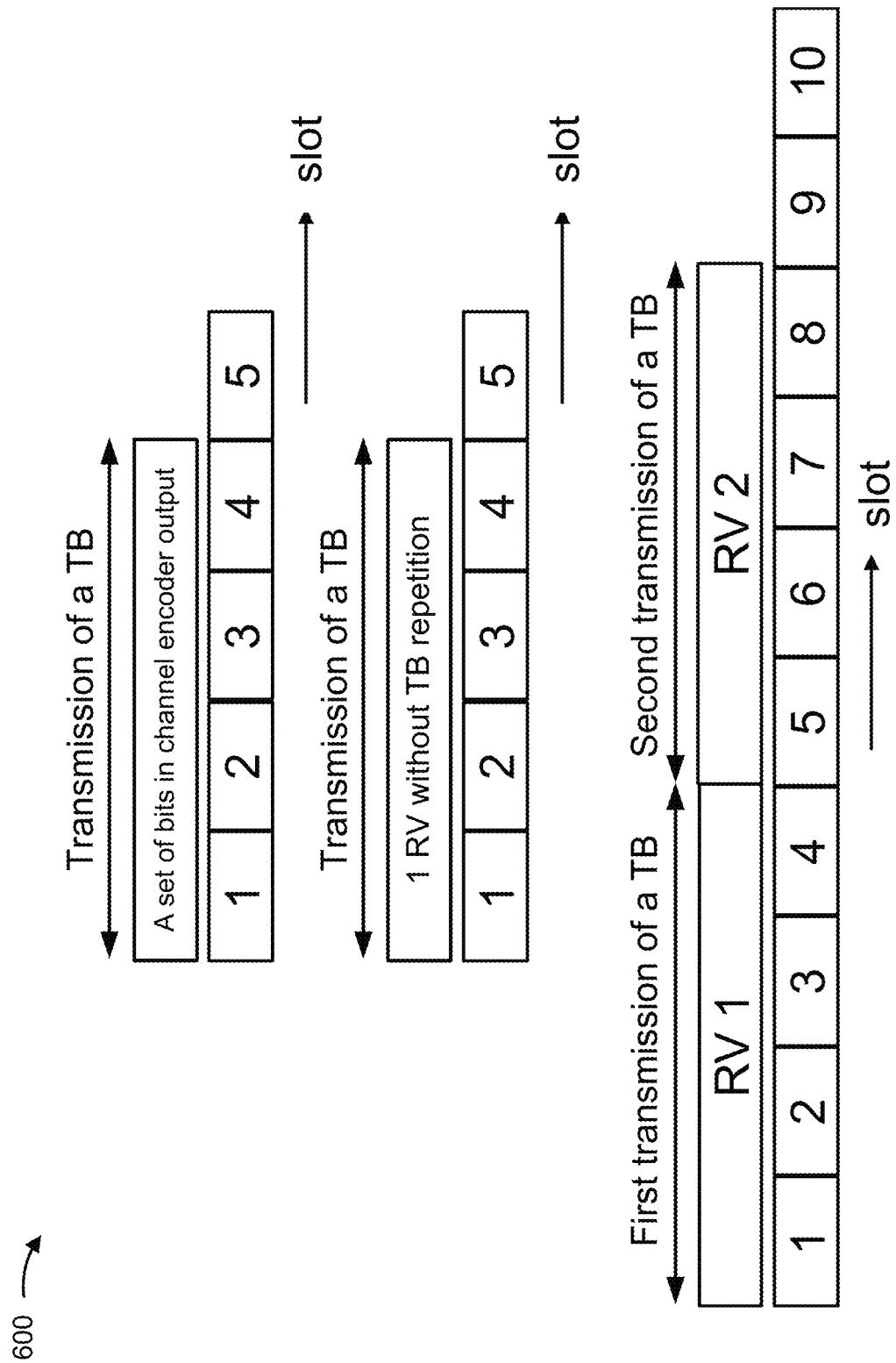
FIG. 6 is a diagram illustrating an example of indicating a span in an NTN, in accordance with various aspects of the present disclosure.

FIG. 6 is a diagram illustrating an example 600 of indicating a span in an NTN, in accordance with various aspects of the present disclosure.

Example 600 shows a transmission of a transport block that is received within a span of 4 slots. The UE may support slot aggregation, where a subset of multiple slots are scheduled for a UE, each carrying a redundancy version. Different redundancy versions may have overlapping bits. Example 600 also shows a set of bits in channel encoder output for a transport block or a redundancy version of a transport block that is received within a span of 4 slots. In some aspects, a length of a span may be 4 slots, but bits for the transport block may be received in 3 or 3.5 slots. Example 600 also shows a repetition of two redundancy versions.

As indicated above, FIG. 6 is provided as an example. Other examples may differ from what is described with regard to FIG. 6.

Figure 7:
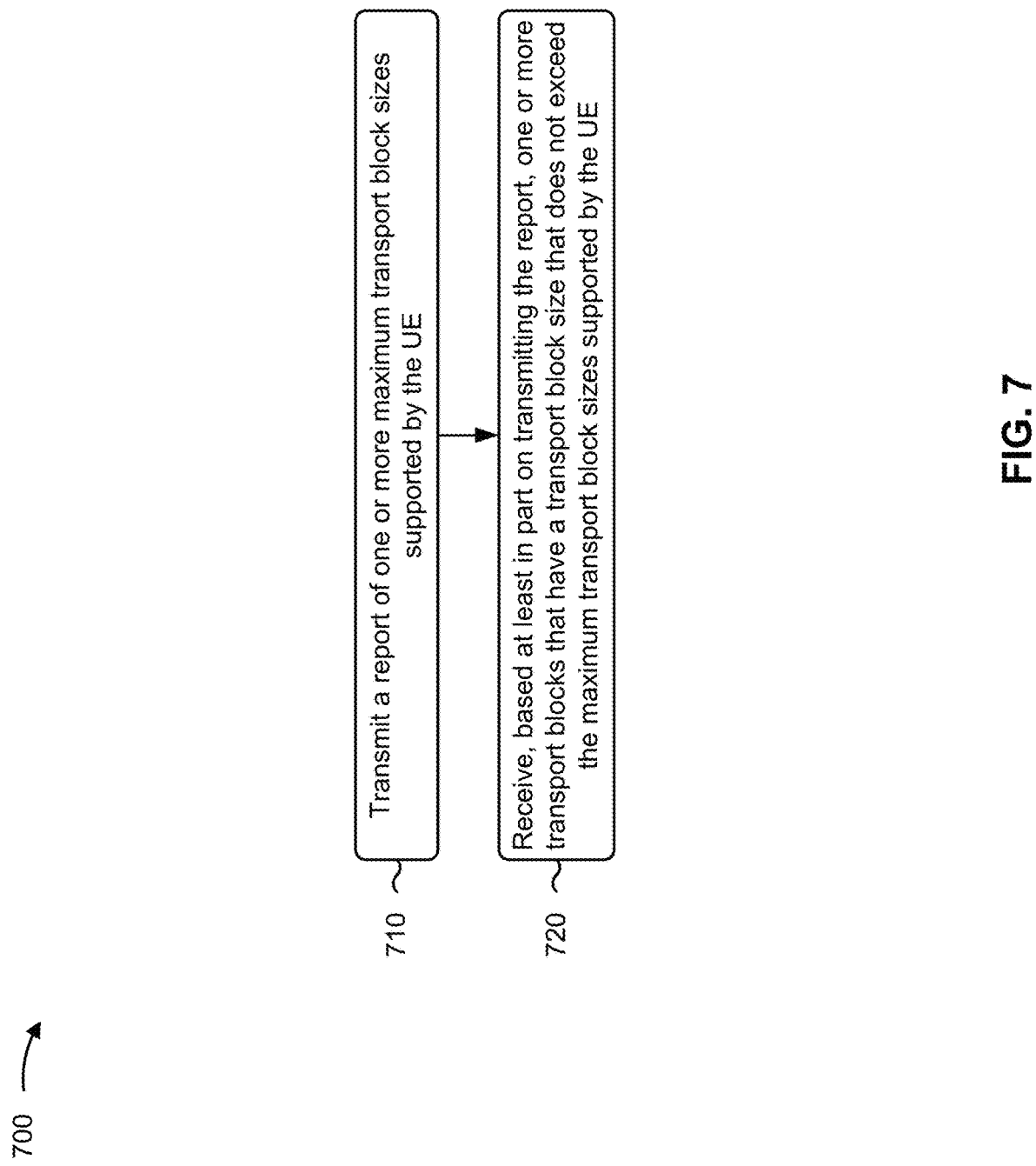
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 depicted in FIGS. 1-3, UE 420 depicted in FIG. 4) performs operations associated with indicating maximum transport block sizes in an NTN.

As shown in FIG. 7, in some aspects, process 700 may include transmitting a report of one or more maximum transport block sizes supported by the UE (block 710). For example, the UE (e.g., using transmission component 1104 depicted in FIG. 11) may transmit a report of one or more maximum transport block sizes supported by the UE, as described in connection with FIGS. 1-6.

Process 700 may include additional aspects, such as any single aspect or any combination of aspects described below and/or in connection with one or more other processes described elsewhere herein.

In a first aspect, the one or more maximum transport block sizes include a maximum transport block size for if HARQ feedback is enabled and a maximum transport block size for if HARQ feedback is disabled.

In a second aspect, alone or in combination with the first aspect, the report indicates a maximum quantity of HARQ processes.

In a third aspect, alone or in combination with one or more of the first and second aspects, process 700 includes determining the one or more maximum transport block sizes based at least in part on a soft buffer size of the UE.

In a fourth aspect, alone or in combination with one or more of the first through third aspects, process 700 includes determining the one or more maximum transport block sizes based at least in part on an MCS or a quantity of layers.

In a fifth aspect, alone or in combination with one or more of the first through fourth aspects, process 700 includes determining the one or more maximum transport block sizes based at least in part on a throughput requirement.

In a sixth aspect, alone or in combination with one or more of the first through fifth aspects, process 700 includes determining the one or more maximum transport block sizes based at least in part on a speed at which the UE processes received communications.

As further shown in FIG. 7, in some aspects, process 700 may include receiving, based at least in part on transmitting the report, one or more transport blocks that have a transport block size equal to one of the maximum transport block sizes supported by the UE (block 720). For example, the UE (e.g., using reception component 1102 depicted in FIG. 11) may receive, based at least in part on transmitting the report, one or more transport blocks that have a transport block size equal to one of the maximum transport block sizes supported by the UE, as described in connection with FIGS. 1-6.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
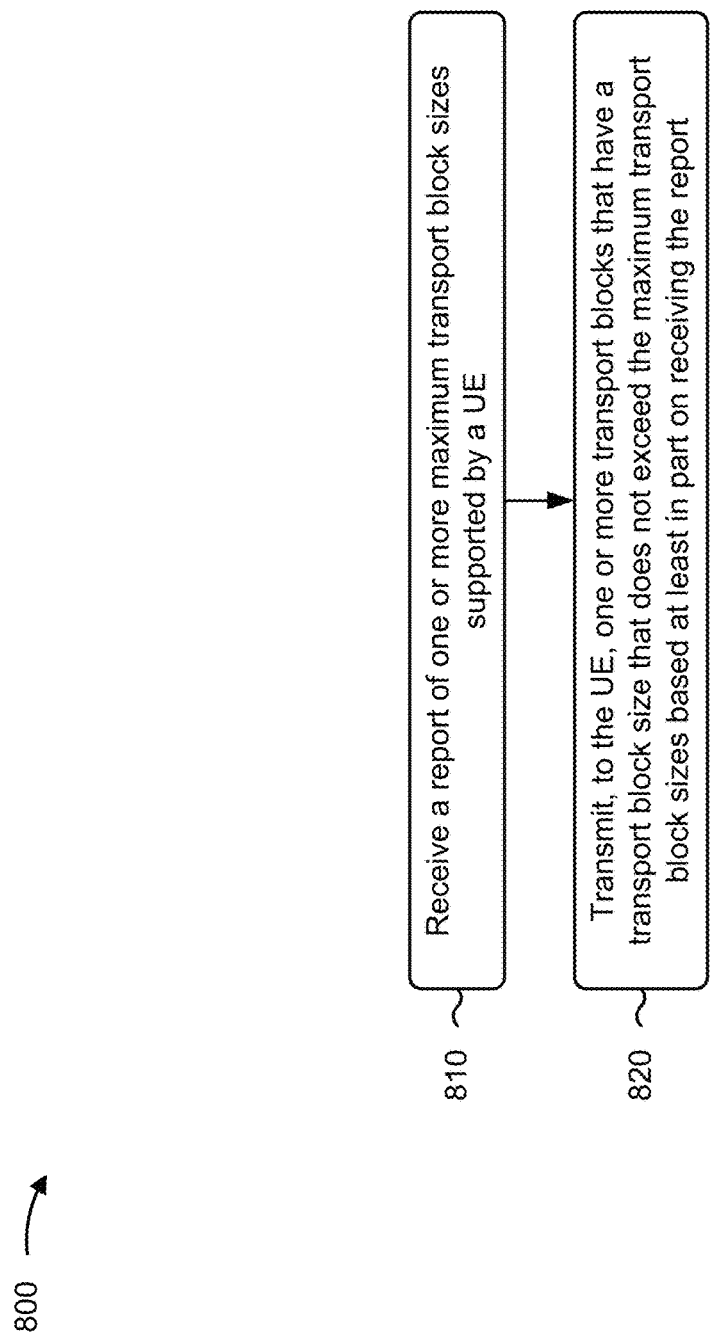
FIG. 8 is a diagram illustrating an example process performed, for example, by an NTN entity, in accordance with various aspects of the present disclosure.

FIG. 8 is a diagram illustrating an example process 800 performed, for example, by an NTN entity, in accordance with various aspects of the present disclosure. Example process 800 is an example where the NTN entity (e.g., base station 110 depicted in FIGS. 1-3, NTN entity depicted in FIG. 1, NTN entity 320 or NTN entity 340 depicted in FIG.

3, NTN entity 410 depicted in FIG. 4) performs operations associated with indicating maximum transport block sizes in an NTN.

As shown in FIG. 8, in some aspects, process 800 may include receiving a report of one or more maximum transport block sizes supported by a UE (block 810). For example, the NTN entity (e.g., using reception component 1202 depicted in FIG. 12) may receive a report of one or more maximum transport block sizes supported by a UE, as described in connection with FIGS. 1-6.

Process 800 may include additional aspects, such as any single aspect or any combination of aspects described below and/or in connection with one or more other processes described elsewhere herein.

In a first aspect, the one or more maximum transport block sizes include a maximum transport block size for if HARQ feedback is enabled and a maximum transport block size for if HARQ feedback is disabled.

In a second aspect, alone or in combination with the first aspect, the report indicates a maximum quantity of HARQ processes.

In a third aspect, alone or in combination with one or more of the first and second aspects, the one or more maximum transport block sizes are associated with a soft buffer size of the UE.

In a fourth aspect, alone or in combination with one or more of the first through third aspects, the one or more maximum transport block sizes are associated with an MCS or a quantity of layers.

In a fifth aspect, alone or in combination with one or more of the first through fourth aspects, the one or more maximum transport block sizes are associated with a throughput requirement for the UE.

In a sixth aspect, alone or in combination with one or more of the first through fifth aspects, the one or more maximum transport block sizes are associated with a speed at which the UE processes received communications.

As further shown in FIG. 8, in some aspects, process 800 may include transmitting, to the UE, one or more transport blocks that have a transport block size equal to one of the maximum transport block sizes, where the transmitting is based at least in part on receiving the report (block 820). For example, the NTN entity (e.g., using transmission component 1204 depicted in FIG. 12) may transmit, to the UE, one or more transport blocks that have a transport block size equal to one of the maximum transport block sizes based at least in part on receiving the report, as described in connection with FIGS. 1-6.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
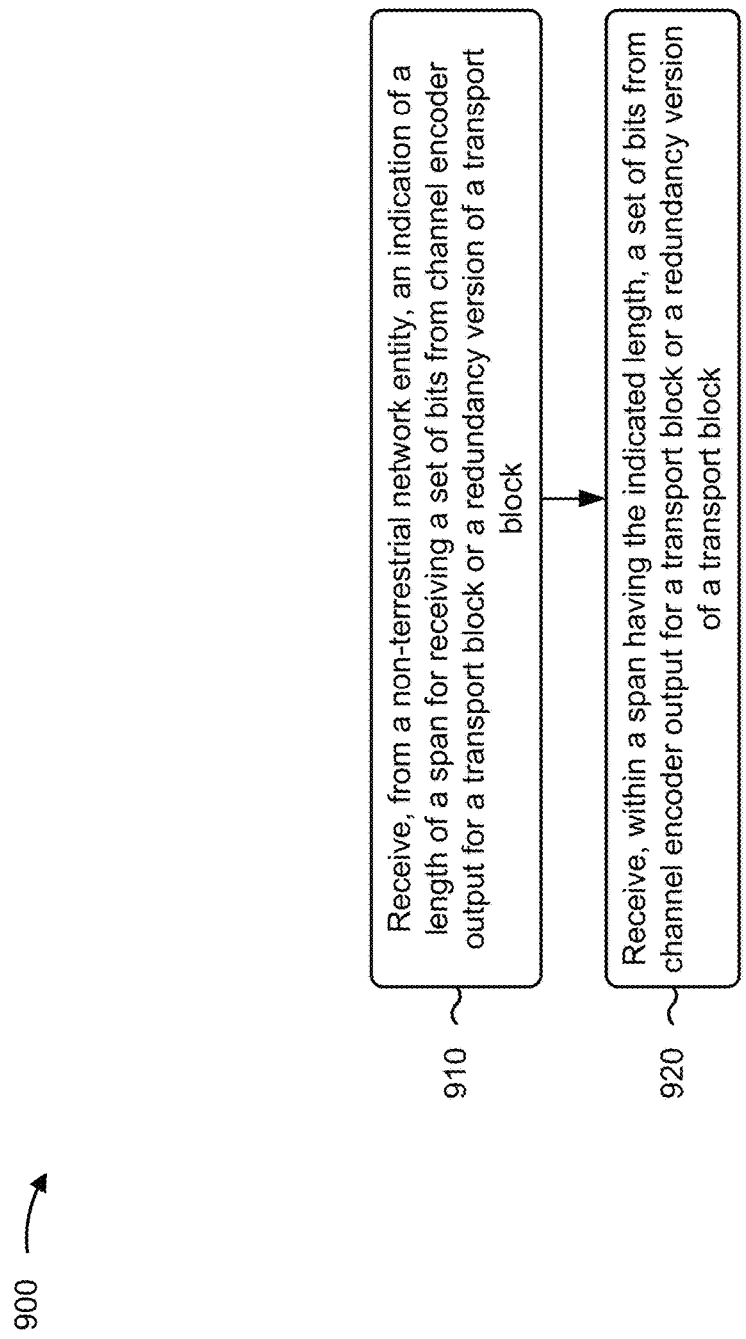
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 depicted in FIGS. 1-3, UE 520 depicted in FIG. 5) performs operations associated with indicating a span for a transport block in an NTN.

As shown in FIG. 9, in some aspects, process 900 may include receiving, from an NTN entity, an indication of a length of a span for receiving a set of bits from channel encoder output for a transport block or a redundancy version of a transport block (block 910). For example, the UE (e.g., using reception component 1302 depicted in FIG. 13) may receive, from an NTN entity, an indication of a length of a span for receiving a set of bits from channel encoder output for a transport block or a redundancy version of a transport block, as described in connection with FIGS. 1-6.

Process 900 may include additional aspects, such as any single aspect or any combination of aspects described below and/or in connection with one or more other processes described elsewhere herein.

In a first aspect, process 900 includes receiving an indication of a starting time for the span, and the span starts at the starting time.

In a second aspect, alone or in combination with the first aspect, process 900 includes determining that the length of the span is less than a slot, equal to a slot, or more than a slot based at least in part on an RNTI used to scramble a CRC of DCI.

In a third aspect, alone or in combination with one or more of the first and second aspects, process 900 includes determining that the length of the span is less than a slot, equal to a slot, or more than a slot based at least in part on a DMRS sequence in DCI.

In a fourth aspect, alone or in combination with one or more of the first through third aspects, process 900 includes determining that the length of the span is less than a slot, equal to a slot, or more than a slot based at least in part on a scrambling sequence applied to rate-matched bits to be modulated.

In a fifth aspect, alone or in combination with one or more of the first through fourth aspects, process 900 includes determining the length of the span from a combination of a redundancy version field and a TDRA, based at least in part on a determination that the length of the span is more than a slot.

In a sixth aspect, alone or in combination with one or more of the first through fifth aspects, receiving the indication includes receiving the indication of the length of the span in an RRC message, a MAC CE, or DCI that schedules the transport block.

In a seventh aspect, alone or in combination with one or more of the first through sixth aspects, process 900 includes determining a recommended length of a span based at least in part on one or more of a maximum transmit power, a path loss, or a quality of service requirement, and transmitting the recommended length of the span.

In an eighth aspect, alone or in combination with one or more of the first through seventh aspects, the length of the span is associated with a soft buffer size of the UE.

In a ninth aspect, alone or in combination with one or more of the first through eighth aspects, the length of the span is associated with an MCS or a quantity of layers.

In a tenth aspect, alone or in combination with one or more of the first through ninth aspects, the length of the span is associated with a throughput requirement.

In an eleventh aspect, alone or in combination with one or more of the first through tenth aspects, the length of the span is indicated as a quantity of slots or a time duration.

In a twelfth aspect, alone or in combination with one or more of the first through eleventh aspects, receiving the indication includes receiving the indication of the length of the span in a MAC CE, an RRC message, or DCI that schedules the transport block or the redundancy version of the transport block.

As further shown in FIG. 9, in some aspects, process 900 may include receiving, within a span having the indicated length, a set of bits from channel encoder output for a transport block or a redundancy version of a transport block (block 920). For example, the UE (e.g., using reception component 1302 depicted in FIG. 13) may receive, within a span having the indicated length, a set of bits from channel encoder output for a transport block or a redundancy version of a transport block, as described in connection with FIGS. 1-6.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
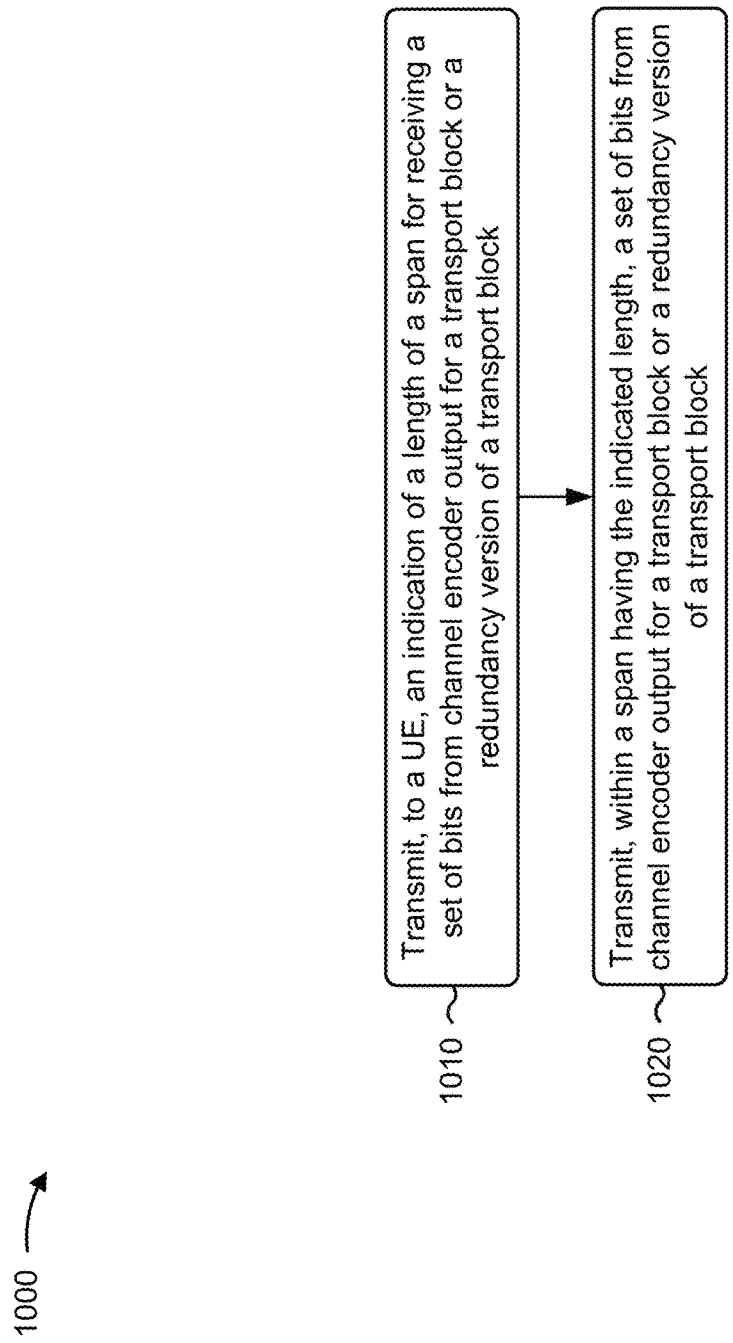
FIG. 10 is a diagram illustrating an example process performed, for example, by an NTN entity, in accordance with various aspects of the present disclosure.

FIG. 10 is a diagram illustrating an example process 1000 performed, for example, by an NTN entity, in accordance with various aspects of the present disclosure. Example process 1000 is an example where the NTN entity (e.g., base station 110 depicted in FIGS. 1-3, NTN entity depicted in FIG. 1, NTN entity 320 or NTN entity 340 depicted in FIG. 3, NTN entity 510 depicted in FIG. 5) performs operations associated with indicating a span for a transport block in an NTN.

As shown in FIG. 10, in some aspects, process 1000 may include transmitting, to a UE, an indication of a length of a span for receiving a set of bits from channel encoder output for a transport block or a redundancy version of a transport block (block 1010). For example, the NTN entity (e.g., using transmission component 1404 depicted in FIG. 14) may transmit, to a UE, an indication of a length of a span for receiving a set of bits from channel encoder output for a transport block or a redundancy version of a transport block, as described in connection with FIGS. 1-6.

Process 1000 may include additional aspects, such as any single aspect or any combination of aspects described below and/or in connection with one or more other processes described elsewhere herein.

In a first aspect, process 1000 includes determining a starting time for the span, and transmitting an indication of the starting time.

In a second aspect, alone or in combination with the first aspect, the indication includes an RNTI used to scramble a CRC of DCI, and the RNTI indicates whether the length of the span is less than a slot, equal to a slot, or more than a slot.

In a third aspect, alone or in combination with one or more of the first and second aspects, the indication includes a DMRS sequence that indicates whether the length of the span is less than a slot, equal to a slot, or more than a slot.

In a fourth aspect, alone or in combination with one or more of the first through third aspects, the indication includes a scrambling sequence applied to rate-matched bits to be modulated, and the scrambling sequence indicates whether the length of the span is less than a slot, equal to a slot, or more than a slot.

In a fifth aspect, alone or in combination with one or more of the first through fourth aspects, the indication includes a combination of a redundancy version field and a TDRA, where the combination indicates the length of the span based at least in part on a determination that the length of the span is more than a slot.

In a sixth aspect, alone or in combination with one or more of the first through fifth aspects, process 1000 includes determining the length of the span based at least in part on a throughput requirement for the UE.

In a seventh aspect, alone or in combination with one or more of the first through sixth aspects, the length of the span is indicated as a quantity of slots or a time duration.

In an eighth aspect, alone or in combination with one or more of the first through seventh aspects, transmitting the indication includes transmitting the indication of the length of the span in an RRC message, a MAC CE, or DCI that schedules the transport block.

In a ninth aspect, alone or in combination with one or more of the first through eighth aspects, process 1000 includes receiving, from the UE, a recommended length of a span, and determining the length of the span based at least in part on the recommended length of a span.

In a tenth aspect, alone or in combination with one or more of the first through ninth aspects, process 1000 includes determining the length of the span based at least in part on a soft buffer size of the UE.

In an eleventh aspect, alone or in combination with one or more of the first through tenth aspects, process 1000 includes determining the length of the span based at least in part on an MCS or a quantity of layers.

In a ninth aspect, alone or in combination with one or more of the first through eighth aspects, process 1000 includes determining a starting time for the span and transmitting an indication of the starting time.

In a tenth aspect, alone or in combination with one or more of the first through ninth aspects, process 1000 includes determining whether a resource allocation is less than a resource block and includes a subset of subcarriers based at least in part on one or more of an RNTI used to scramble a CRC of DCI, a DMRS sequence in DCI, or a scrambling sequence applied to rate-matched bits to be modulated.

As further shown in FIG. 10, in some aspects, process 1000 may include transmitting, within a span having the indicated length, a set of bits from channel encoder output for a transport block or a redundancy version of a transport block (block 1020). For example, the NTN entity (e.g., using transmission component 1404 depicted in FIG. 14) may transmit, within a span having the indicated length, a set of bits from channel encoder output for a transport block or a redundancy version of a transport block, as described in connection with FIGS. 1-6.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
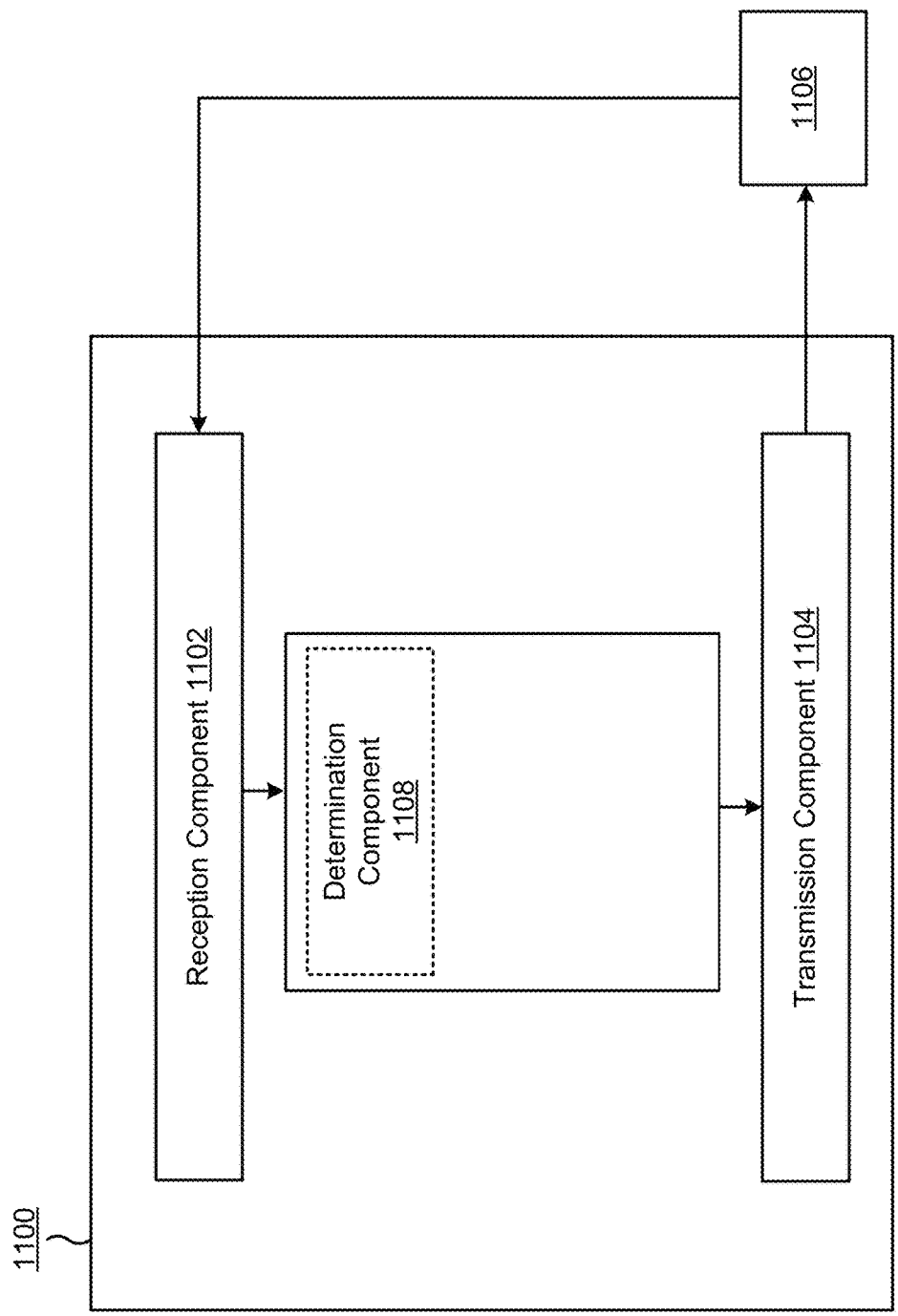
FIGS. 11-14 are block diagrams of example apparatuses for wireless communication, in accordance with various aspects of the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, an NTN entity, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 1-6. Additionally, or alternatively, the apparatus 1100 may be configured to perform one or more processes described herein, such as process 700 of FIG. 7. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG.

2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The transmission component 1104 may transmit a report of one or more maximum transport block sizes supported by the UE. The reception component 1102 may receive, based at least in part on transmitting the report, one or more transport blocks that have a transport block size equal to one of the maximum transport block sizes supported by the UE. There may be a maximum transport block size for if HARQ feedback is enabled, and a maximum transport block size for if HARQ feedback is disabled.

The determination component 1108 may determine the one or more maximum transport block sizes based at least in part on a soft buffer size of the UE. In some aspects, the determination component 1108 may include a demodulator, a MIMO detector, a receive processor, a modulator, a transmit MIMO processor, a transmit processor, a controller/processor, a memory, or a combination thereof, of the UE described above in connection with FIG. 2. The determination component 1108 may determine the one or more maximum transport block sizes based at least in part on a speed at which the UE processes received communications.

The determination component 1108 may determine the one or more maximum transport block sizes based at least in part on a throughput requirement.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
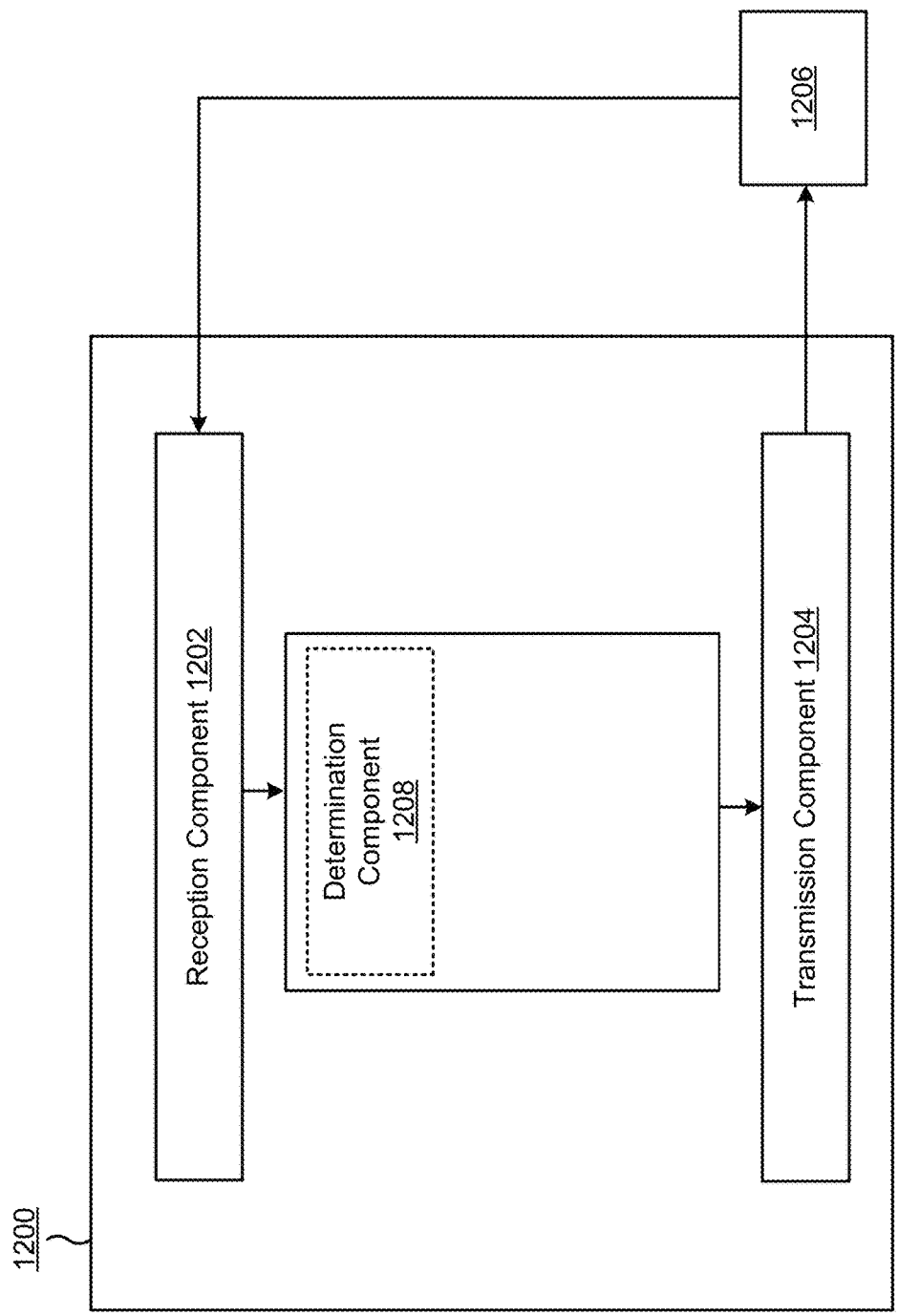

FIG. 12 is a block diagram of an example apparatus 1200 for wireless communication. The apparatus 1200 may be an NTN entity, or an NTN entity may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208, among other examples.

In some aspects, the apparatus 1200 may be configured to perform one or more operations described herein in connection with FIGS. 1-6. Additionally, or alternatively, the apparatus 1200 may be configured to perform one or more processes described herein, such as process 800 of FIG. 8. In some aspects, the apparatus 1200 and/or one or more components shown in FIG. 12 may include one or more components of the NTN entity described above in connection with FIGS. 1-3. Additionally, or alternatively, one or more components shown in FIG. 12 may be implemented within one or more components described above in connection with FIGS. 1-3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the NTN entity described above in connection with FIGS. 1-3.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the NTN entity described above in connection with FIGS. 1-3. In some aspects, the transmission component 1204 may be co-located with the reception component 1202 in a transceiver.

The reception component 1202 may receive a report of one or more maximum transport block sizes supported by a UE. The determination component 1208 may determine to transmit a transport block of a maximum transport block size for the UE. In some aspects, the determination component 1208 may include a controller/processor, a memory, or a combination thereof, of the NTN entity described above in connection with FIGS. 1-3. The transmission component 1204 may transmit, to the UE, one or more transport blocks that have a transport block size equal to one of the maximum transport block sizes based at least in part on receiving the report.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
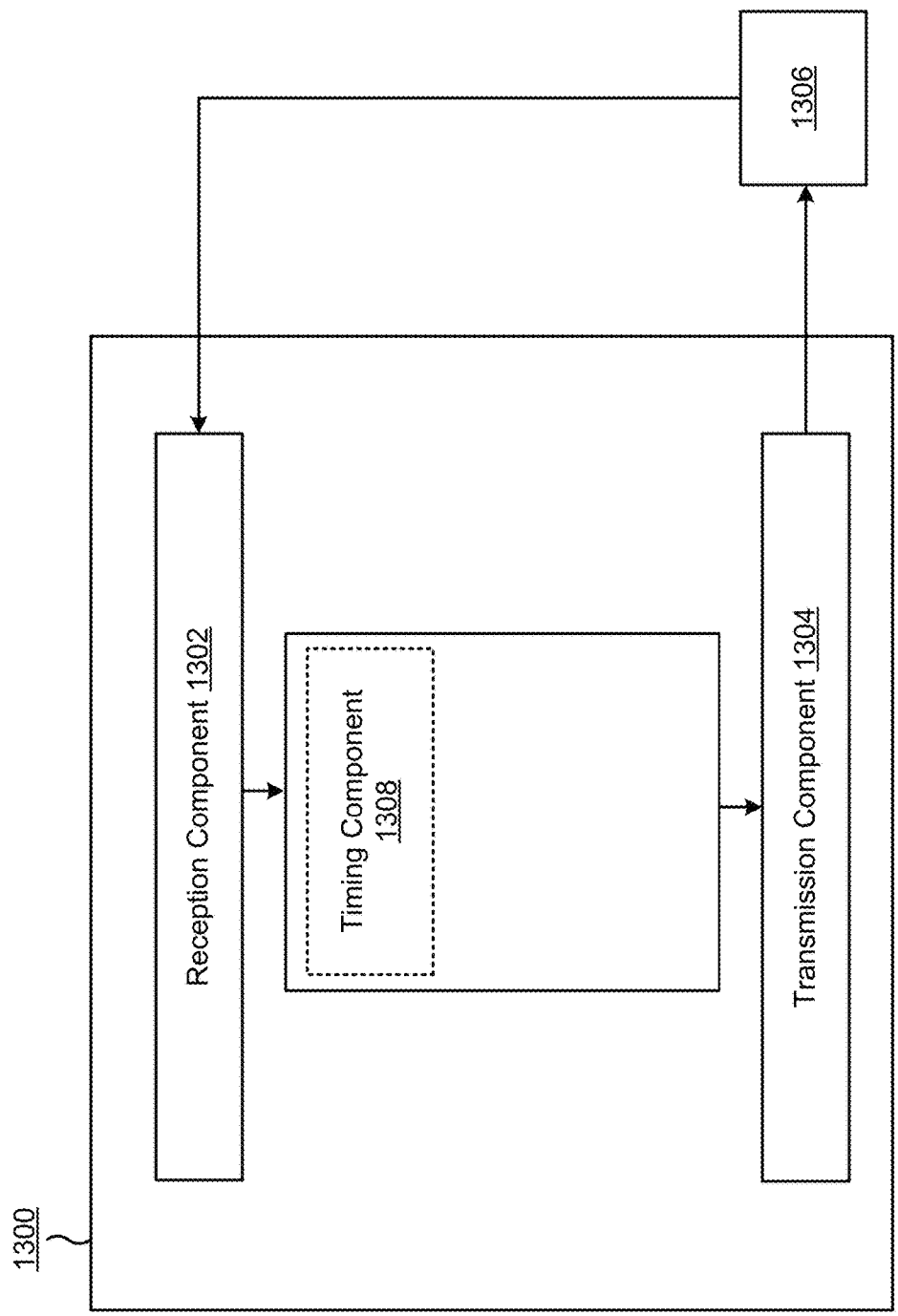

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, an NTN entity, or another wireless communication device) using the reception component 1302 and the transmission component 1304. As further shown, the apparatus 1300 may include a timing component 1308, among other examples.

In some aspects, the apparatus 1300 may be configured to perform one or more operations described herein in connection with FIGS. 1-6. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive, from an NTN entity, an indication of a length of a span for receiving a set of bits from channel encoder output for a transport block or a redundancy version of a transport block. The timing component 1308 may adjust a length of a span for receiving a transport block based at least in part on the indicated length. In some aspects, the timing component 1308 may include a demodulator, a MIMO detector, a receive processor, a controller/processor, a memory, or a combination thereof, of the UE described above in connection with FIG. 2. The timing component 1308 may determine that the length of the span is less than a slot, equal to a slot, or more than a slot based at least in part on an RNTI used to scramble a CRC of DCI. The timing component 1308 may determine that the length of the span is less than a slot, equal to a slot, or more than a slot based at least in part on a DMRS sequence in DCI. The timing component 1308 may determine that the length of the span is less than a slot, equal to a slot, or more than a slot based at least in part on a scrambling sequence applied to rate-matched bits to be modulated. The timing component 1308 may determine the length of the span from a combination of a redundancy version field and a TDRA, based at least in part on a determination that the length of the span is more than a slot.

The reception component 1302 may receive, within a span having the indicated length, a set of bits from channel encoder output for a transport block or a redundancy version of a transport block. The reception component 1302 may receive an indication of a starting time for the span, and wherein the span starts at the starting time. The reception component 1302 may receive an indication, and the timing component 1308 may use the indication to determine whether a resource allocation is less than a resource block and includes a subset of subcarriers. The indication may be an RNTI used to scramble a CRC of DCI, a DMRS sequence in DCI, or a scrambling sequence applied to rate-matched bits to be modulated.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
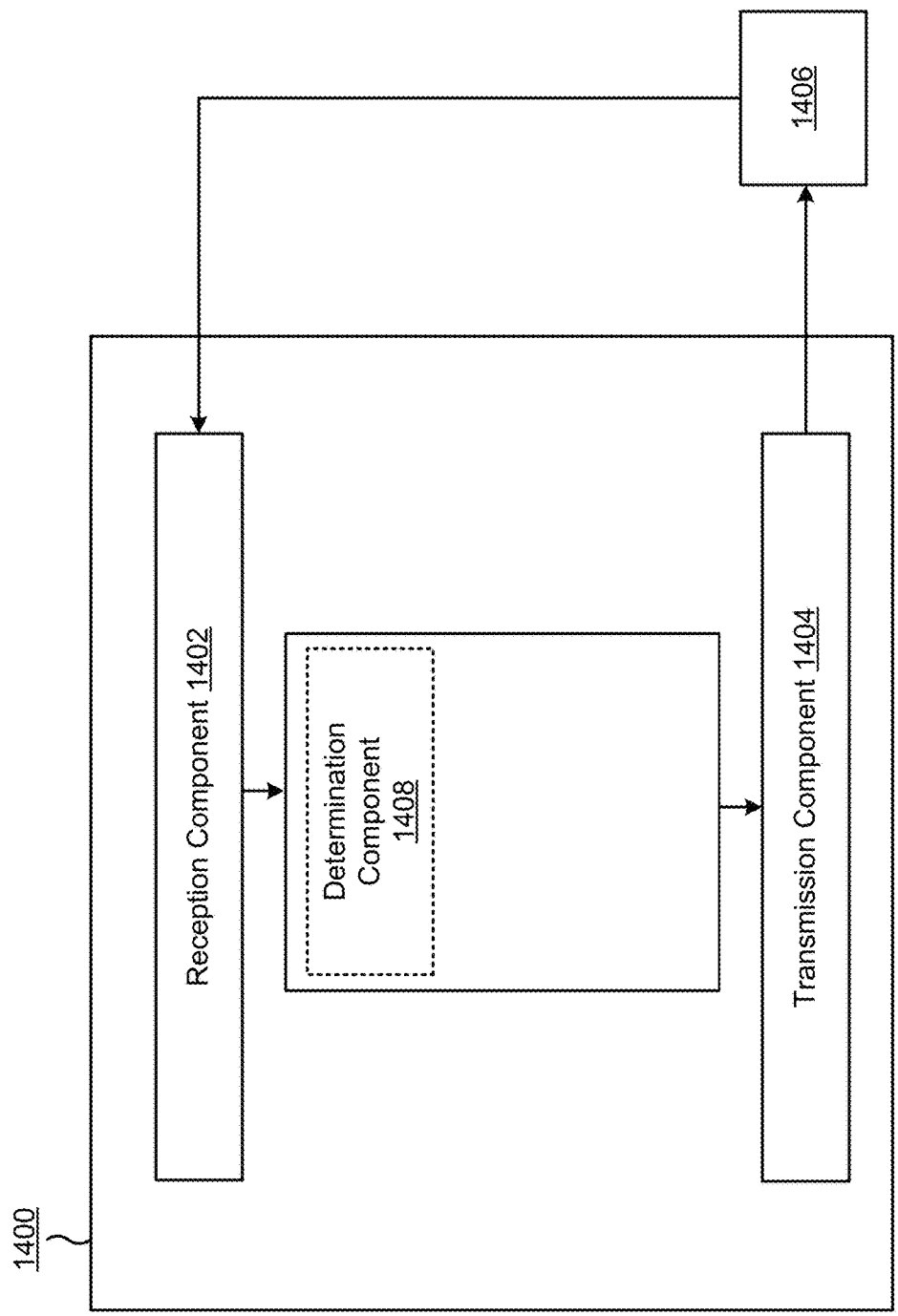

FIG. 14 is a block diagram of an example apparatus 1400 for wireless communication. The apparatus 1400 may be an NTN entity, or an NTN entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 1-6. Additionally, or alternatively, the apparatus 1400 may be configured to perform one or more processes described herein, such as process 1000 of FIG. 10. In some aspects, the apparatus 1400 and/or one or more components shown in FIG. 14 may include one or more components of the NTN entity described above in connection with FIGS. 1-3. Additionally, or alternatively, one or more components shown in FIG. 14 may be implemented within one or more components described above in connection with FIGS. 1-3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the NTN entity described above in connection with FIGS. 1-3.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the NTN entity described above in connection with FIGS. 1-3. In some aspects, the transmission component 1404 may be co-located with the reception component 1402 in a transceiver.

The transmission component 1404 may transmit, to a UE, an indication of a length of a span for receiving a set of bits from channel encoder output for a transport block or a redundancy version of a transport block. The transmission component 1404 may transmit, within a span having the indicated length, a set of bits from channel encoder output for a transport block or a redundancy version of a transport block.

The determination component 1408 may determine a starting time for the span, and the transmission component 1404 may transmit an indication of the starting time. The determination component 1408 may determine the length of the span based at least in part on a soft buffer size of the UE. In some aspects, the determination component 1408 may include a demodulator, a MIMO detector, a receive processor, a modulator, a controller/processor, a memory, or a combination thereof, of the NTN entity described above in connection with FIGS. 1-3. The determination component 1408 may determine the length of the span based at least in part on a speed at which the UE processes received communications. The determination component 1408 may determine the length of the span based at least in part on a throughput requirement for the UE. The transmission component 1404 may transmit an indication of whether a resource allocation (e.g., FDRA) is less than a resource block and includes a subset of subcarriers, where the indication includes an RNTI used to scramble a CRC of DCI, a DMRS sequence in DCI, or a scrambling sequence applied to rate-matched bits to be modulated.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of aspects of the present disclosure:

Aspect 1: A method of wireless communication performed by a user equipment (UE), comprising: transmitting a report of one or more maximum transport block sizes supported by the UE; and receiving, based at least in part on transmitting the report, one or more transport blocks that have a transport block size that does not exceed the maximum transport block sizes supported by the UE.

Aspect 2: The method of aspect 1, wherein the one or more maximum transport block sizes include a maximum transport block size for if hybrid automatic repeat request (HARQ) feedback is enabled and a maximum transport block size for if HARQ feedback is disabled.

Aspect 3: The method of aspect 1 or 2, wherein the report indicates a maximum quantity of HARQ processes.

Aspect 4: The method of any of aspects 1-3, further comprising determining the one or more maximum transport block sizes based at least in part on a soft buffer size of the UE.

Aspect 5: The method of any of aspects 1-4, further comprising determining the one or more maximum transport block sizes based at least in part on a speed at which the UE processes received communications.

Aspect 6: The method of any of aspects 1-5, further comprising determining the one or more maximum transport block sizes based at least in part on a throughput requirement.

Aspect 7: A method of wireless communication performed by a non-terrestrial network entity, comprising: receiving a report of one or more maximum transport block sizes supported by a user equipment (UE); and transmitting, to the UE, one or more transport blocks that have a transport block size that does not exceed the maximum transport block sizes based at least in part on receiving the report.

Aspect 8: The method of aspect 7, wherein the one or more maximum transport block sizes include a maximum transport block size for if hybrid automatic repeat request (HARQ) feedback is enabled and a maximum transport block size for if HARQ feedback is disabled.

Aspect 9: The method of aspect 7 or 8, wherein the report indicates a maximum quantity of HARQ processes.

Aspect 10: The method of any of aspects 7-9, wherein the one or more maximum transport block sizes is associated with a soft buffer size of the UE.

Aspect 11: The method of any of aspects 7-10, wherein the one or more maximum transport block sizes is associated with a speed at which the UE processes received communications.

Aspect 12: The method of any of aspects 7-11, wherein the one or more maximum transport block sizes are associated with a throughput requirement for the UE.

Aspect 13: A method of wireless communication performed by a user equipment (UE), comprising: receiving, from a non-terrestrial network entity, an indication of a length of a span for receiving a set of bits from channel encoder output for a transport block or a redundancy version of a transport block; and receiving, within a span having the indicated length, a set of bits from channel encoder output for a transport block or a redundancy version of a transport block.

Aspect 14: The method of aspect 13, further comprising receiving an indication of a starting time for the span, and wherein the span starts at the starting time.

Aspect 15: The method of aspect 13 or 14, further comprising determining that the length of the span is less than a slot, equal to a slot, or more than a slot based at least in part on a radio network temporary identifier used to scramble a cyclic redundancy check of downlink control information.

Aspect 16: The method of any of aspects 13-15, further comprising determining that the length of the span is less than a slot, equal to a slot, or more than a slot based at least in part on a demodulation reference signal sequence in downlink control information.

Aspect 17: The method of any of aspects 13-16, further comprising determining that the length of the span is less than a slot, equal to a slot, or more than a slot based at least in part on a scrambling sequence applied to rate-matched bits to be modulated.

Aspect 18: The method of any of aspects 13-17, further comprising determining the length of the span from a combination of a redundancy version field and a time domain resource assignment, based at least in part on a determination that the length of the span is more than a slot.

Aspect 19: The method of aspect 13, wherein receiving the indication includes receiving the indication of the length of the span in a radio resource control message, a medium access control control element, or downlink control information that schedules the transport block.

Aspect 20: The method of any of aspects 13-19, further comprising: determining a recommended length of a span based at least in part on one or more of a maximum transmit power, a path loss, or a quality of service requirement; and transmitting the recommended length of the span.

Aspect 21: The method of any of aspects 13-20, further comprising: determining whether a resource allocation is less than a resource block and includes a subset of subcarriers based at least in part on one or more of a radio network temporary identifier used to scramble a cyclic redundancy check of downlink control information, a demodulation reference signal sequence in downlink control information, or a scrambling sequence applied to rate-matched bits to be modulated.

Aspect 22: A method of wireless communication performed by a non-terrestrial network entity, comprising: transmitting, to a user equipment (UE), an indication of a length of a span for receiving a set of bits from channel encoder output for a transport block or a redundancy version of a transport block; and transmitting, within a span having the indicated length, a set of bits from channel encoder output for a transport block or a redundancy version of a transport block.

Aspect 23: The method of aspect 22, further comprising: determining a starting time for the span; and transmitting an indication of the starting time.

Aspect 24: The method of aspect 22 or 23, wherein the indication includes a radio network temporary identifier (RNTI) used to scramble a cyclic redundancy check of downlink information, and wherein the RNTI indicates whether the length of the span is less than a slot, equal to a slot, or more than a slot.

Aspect 25: The method of any of aspects 22-24, wherein the indication includes a demodulation reference signal sequence that indicates whether the length of the span is less than a slot, equal to a slot, or more than a slot.

Aspect 26: The method of any of aspects 22-25, wherein the indication includes a scrambling sequence applied to rate-matched bits to be modulated, and wherein the scrambling sequence indicates whether the length of the span is less than a slot, equal to a slot, or more than a slot.

Aspect 27: The method of any of aspects 22-26, wherein the indication includes a combination of a redundancy version field and a time domain resource assignment, wherein the combination indicates the length of the span based at least in part on a determination that the length of the span is more than a slot.

Aspect 28: The method of any of aspects 22-27, further comprising determining the length of the span based at least in part on a throughput requirement for the UE.

Aspect 29: The method of any of aspects, 22-28, wherein transmitting the indication includes transmitting the indication of the length of the span in a radio resource control message, a medium access control control element, or downlink control information that schedules the transport block.

Aspect 30: The method of any of aspects 22-29, further comprising: receiving, from the UE, a recommended length of a span; and determining the length of the span based at least in part on the recommended length of a span.

Aspect 31: An apparatus for wireless communication at a device, comprising a processor; memory coupled with the processor; and instructions stored in the memory and executable by the processor to cause the apparatus to perform the method of one or more aspects of aspects 1-6.

Aspect 32: A device for wireless communication, comprising a memory and one or more processors coupled to the memory, the memory and the one or more processors configured to perform the method of one or more aspects of aspects 1-6.

Aspect 33: An apparatus for wireless communication, comprising at least one means for performing the method of one or more aspects of aspects 1-6.

Aspect 34: A non-transitory computer-readable medium storing code for wireless communication, the code comprising instructions executable by a processor to perform the method of one or more aspects of aspects 1-6.

Aspect 35: A non-transitory computer-readable medium storing a set of instructions for wireless communication, the set of instructions comprising one or more instructions that, when executed by one or more processors of a device, cause the device to perform the method of one or more aspects of aspects 1-6.

Aspect 36: An apparatus for wireless communication at a device, comprising a processor; memory coupled with the processor; and instructions stored in the memory and executable by the processor to cause the apparatus to perform the method of one or more aspects of aspects 7-12.

Aspect 37: A device for wireless communication, comprising a memory and one or more processors coupled to the memory, the memory and the one or more processors configured to perform the method of one or more aspects of aspects 7-12.

Aspect 38: An apparatus for wireless communication, comprising at least one means for performing the method of one or more aspects of aspects 7-12.

Aspect 39: A non-transitory computer-readable medium storing code for wireless communication, the code comprising instructions executable by a processor to perform the method of one or more aspects of aspects 7-12.

Aspect 40: A non-transitory computer-readable medium storing a set of instructions for wireless communication, the set of instructions comprising one or more instructions that, when executed by one or more processors of a device, cause the device to perform the method of one or more aspects of aspects 7-12.

Aspect 41: An apparatus for wireless communication at a device, comprising a processor; memory coupled with the processor; and instructions stored in the memory and executable by the processor to cause the apparatus to perform the method of one or more aspects of aspects 13-20.

Aspect 42: A device for wireless communication, comprising a memory and one or more processors coupled to the memory, the memory and the one or more processors configured to perform the method of one or more aspects of aspects 13-20.

Aspect 43: An apparatus for wireless communication, comprising at least one means for performing the method of one or more aspects of aspects 13-20.

Aspect 44: A non-transitory computer-readable medium storing code for wireless communication, the code comprising instructions executable by a processor to perform the method of one or more aspects of aspects 13-20.

Aspect 45: A non-transitory computer-readable medium storing a set of instructions for wireless communication, the set of instructions comprising one or more instructions that, when executed by one or more processors of a device, cause the device to perform the method of one or more aspects of aspects 13-20.

Aspect 46: An apparatus for wireless communication at a device, comprising a processor; memory coupled with the processor; and instructions stored in the memory and executable by the processor to cause the apparatus to perform the method of one or more aspects of aspects 21-30.

Aspect 47: A device for wireless communication, comprising a memory and one or more processors coupled to the memory, the memory and the one or more processors configured to perform the method of one or more aspects of aspects 21-30.

Aspect 48: An apparatus for wireless communication, comprising at least one means for performing the method of one or more aspects of aspects 21-30.

Aspect 49: A non-transitory computer-readable medium storing code for wireless communication, the code comprising instructions executable by a processor to perform the method of one or more aspects of aspects 21-30.

Aspect 50: A non-transitory computer-readable medium storing a set of instructions for wireless communication, the set of instructions comprising one or more instructions that, when executed by one or more processors of a device, cause the device to perform the method of one or more aspects of aspects 21-30.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a non-terrestrial network (NTN) entity, a report of one or more maximum transport block sizes supported by the UE, wherein the report includes a first maximum transport block size, of the one or more maximum transport block sizes, for when hybrid automatic repeat request (HARQ) feedback is enabled and a second maximum transport block size, of the one or more maximum transport block sizes, for when HARQ feedback is disabled; and
   receiving, from the NTN entity and based at least in part on transmitting the report, one or more transport blocks that have a transport block size that does not exceed the first maximum transport block size, when the HARQ feedback is enabled, or the second maximum transport block size when the HARQ feedback is disabled.

2. The method of claim 1, wherein the report indicates a maximum quantity of HARQ processes.

3. The method of claim 1, further comprising determining the one or more maximum transport block sizes based at least in part on a soft buffer size of the UE.

4. The method of claim 1, further comprising determining the one or more maximum transport block sizes based at least in part on a speed at which the UE processes received communications.

5. The method of claim 1, further comprising determining the one or more maximum transport block sizes based at least in part on a throughput requirement.

6. The method of claim 1, wherein the transport block size of the one or more transport blocks is less than the first maximum transport block size, when the HARQ feedback is enabled, or the second maximum transport block size when the HARQ feedback is disabled.

7. The method of claim 1, wherein the transport block size of the one or more transport blocks is equal to the first maximum transport block size when the HARQ feedback is enabled or the second maximum transport block size when the HARQ feedback is disabled.

8. A method of wireless communication performed by a non-terrestrial network entity, comprising:
   receiving, from a user equipment (UE), a report of one or more maximum transport block sizes supported by the UE, wherein the report includes a first maximum transport block size, of the one or more maximum transport block sizes, for when hybrid automatic repeat request (HARQ) feedback is enabled and a second maximum transport block size, of the one or more maximum transport block sizes, for when HARQ feedback is disabled; and
   transmitting, to the UE and based at least in part on receiving the report, one or more transport blocks that have a transport block size that does not exceed the first maximum transport block sizes, when the HARQ feedback is enabled, or the second maximum transport block size when the HARQ feedback is disabled.

9. The method of claim 8, wherein the report indicates a maximum quantity of HARQ processes.

10. The method of claim 8, wherein the one or more maximum transport block sizes is associated with a soft buffer size of the UE.

11. The method of claim 8, wherein the one or more maximum transport block sizes is associated with a speed at which the UE processes received communications.

12. The method of claim 8, wherein the one or more maximum transport block sizes are associated with a throughput requirement for the UE.

13. The method of claim 8, further comprising:
   determine the transport block size of the one or more transport blocks based at least in part on the one or more maximum transport block sizes, supported by the UE, of the report.

14. The method of claim 8, wherein the transport block size of the one or more transport blocks is equal to the first maximum transport block size, when the HARQ feedback is enabled, or the second maximum transport block size when the HARQ feedback is disabled.

15. The method of claim 8, wherein the transport block size of the one or more transport blocks is equal to the first maximum transport block size when the HARQ feedback is enabled or the second maximum transport block size when the HARQ feedback is disabled.

16. A user equipment (UE) for wireless communication, comprising:
   a memory; and
   one or more processors, coupled to the memory, configured to:
      transmit, to a non-terrestrial network (NTN) entity, a report of one or more maximum transport block sizes supported by the UE wherein the report includes a first maximum transport block size, of the one or more maximum transport block sizes, for when hybrid automatic repeat request (HARQ) feedback is enabled and a second maximum transport block size, of the one or more maximum transport block sizes, for when HARQ feedback is disabled; and receive, from the NTN entity and based at least in part on transmitting the report, one or more transport blocks that have a transport block size that does not exceed the first maximum transport block size, when the HARQ feedback is enabled, or the second maximum transport block size when the HARQ feedback is disabled.

17. The UE of claim 16, wherein the report indicates a maximum quantity of HARQ processes.

18. The UE of claim 16, wherein the one or more processors are further configured to determine the one or more maximum transport block sizes based at least in part on a soft buffer size of the UE.

19. The UE of claim 16, wherein the one or more processors are further configured to determine the one or more maximum transport block sizes based at least in part on a speed at which the UE processes received communications.

20. The UE of claim 16, wherein the one or more processors are further configured to determine the one or more maximum transport block sizes based at least in part on a throughput requirement.

21. The UE of claim 16, wherein the transport block size of the one or more transport blocks is less than the first maximum transport block size, when the HARQ feedback is enabled, or the second maximum transport block size when the HARQ feedback is disabled.

22. The UE of claim 16, wherein the transport block size of the one or more transport blocks is equal to the first maximum transport block size, when the HARQ feedback is enabled, or the second maximum transport block size when the HARQ feedback is disabled.

23. A non-terrestrial network entity for wireless communication, comprising:
a memory; and
one or more processors, coupled to the memory, configured to:
receive, from a user equipment (UE), a report of one or more maximum transport block sizes supported by a user equipment (UE), wherein the report includes a first maximum transport block size, of the one or more maximum transport block sizes, for when hybrid automatic repeat request (HARQ) feedback is enabled and a second maximum transport block size, of the one or more maximum transport block sizes, for when HARQ feedback is disabled; and transmit, to the UE and based at least in part on receiving the report, one or more transport blocks that have a transport block size that does not exceed the first maximum transport block sizes, when the HARQ feedback is enabled, or the second maximum transport block size when the HARQ feedback is disabled.

24. The non-terrestrial network entity of claim 23, wherein the report indicates a maximum quantity of HARQ processes.

25. The non-terrestrial network entity of claim 23, wherein the one or more maximum transport block sizes is associated with a soft buffer size of the UE.

26. The non-terrestrial network entity of claim 23, wherein the one or more maximum transport block sizes is associated with a speed at which the UE processes received communications.

27. The non-terrestrial network entity of claim 23, wherein the one or more maximum transport block sizes are associated with a throughput requirement for the UE.

28. The non-terrestrial network entity of claim 23, wherein the one or more processors are further configured to:
determine the transport block size of the one or more transport blocks based at least in part on the one or more maximum transport block sizes, supported by the UE, of the report.

29. The non-terrestrial network entity of claim 23, wherein the transport block size of the one or more transport blocks is equal to the first maximum transport block size, when the HARQ feedback is enabled, or the second maximum transport block size when the HARQ feedback is disabled.

30. The non-terrestrial network entity of claim 23, wherein the transport block size of the one or more transport blocks is less than the first maximum transport block size, when the HARQ feedback is enabled, or the second maximum transport block size when the HARQ feedback is disabled.

* * * * *